(12) United States Patent
Behzad

(10) Patent No.: US 7,616,929 B2
(45) Date of Patent: Nov. 10, 2009

(54) CROSS-CORE CALIBRATION IN A MULTI-RADIO SYSTEM

(75) Inventor: Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 655 days.

(21) Appl. No.: 11/359,222

(22) Filed: Feb. 21, 2006

(65) Prior Publication Data

US 2006/0223558 A1      Oct. 5, 2006

Related U.S. Application Data

(63) Continuation-in-part of application No. 11/173,043, filed on Jul. 1, 2005, now Pat. No. 7,356,325.

(60) Provisional application No. 60/668,050, filed on Apr. 4, 2005, provisional application No. 60/760,237, filed on Jan. 19, 2006.

(51) Int. Cl.
*H04B 17/00* (2006.01)

(52) U.S. Cl. ............ 455/67.14; 455/67.11; 455/115.1; 455/115.2; 342/174; 342/368

(58) Field of Classification Search ........... 455/41.1, 455/41.2, 73, 313, 323, 333, 334, 552.1, 455/561, 562.1, 115.1–115.2, 67.11, 67.14; 342/174, 359, 368

See application file for complete search history.

(56) References Cited

U.S. PATENT DOCUMENTS

| | | | | |
|---|---|---|---|---|
| 5,412,414 A | * | 5/1995 | Ast et al. .................... 342/174 |
| 5,966,666 A | * | 10/1999 | Yamaguchi et al. ...... 455/552.1 |
| 6,339,399 B1 | * | 1/2002 | Andersson et al. .......... 342/372 |
| 6,496,140 B1 | * | 12/2002 | Alastalo ..................... 342/174 |
| 6,690,953 B2 | * | 2/2004 | Rexberg et al. .......... 455/562.1 |
| 6,693,588 B1 | * | 2/2004 | Schlee ........................ 342/368 |
| 6,728,517 B2 | * | 4/2004 | Sugar et al. .................... 455/73 |
| 7,248,216 B2 | * | 7/2007 | Akiyama et al. ............ 342/368 |
| 7,340,248 B2 | * | 3/2008 | Kawasaki et al. ........... 455/423 |
| 2004/0171408 A1 | * | 9/2004 | Maruta ..................... 455/562.1 |
| 2005/0064892 A1 | * | 3/2005 | Cavin ....................... 455/550.1 |
| 2006/0227040 A1 | * | 10/2006 | Christian et al. ............. 342/174 |

\* cited by examiner

*Primary Examiner*—Nguyen Vo
*Assistant Examiner*—Junpeng Chen
(74) *Attorney, Agent, or Firm*—Garlick Harrison & Markison

(57) ABSTRACT

A Radio Frequency (RF) transceiver includes a first RF transceiver group, a second RF transceiver group, local oscillation circuitry, and calibration control circuitry. Each of the RF transceiver group has an RF transmitter and an RF receiver. The local oscillation circuitry selectively produces a local oscillation to the first RF transceiver group and to the second RF transceiver group. The calibration control circuitry is operable to initiate calibration operations including transmitter self calibration operations, first loopback calibration operations, and second loopback calibration operations. During loopback calibration operations, test signals produced by an RF transceiver group are looped back to an RF receiver of another RF transceiver group.

31 Claims, 15 Drawing Sheets

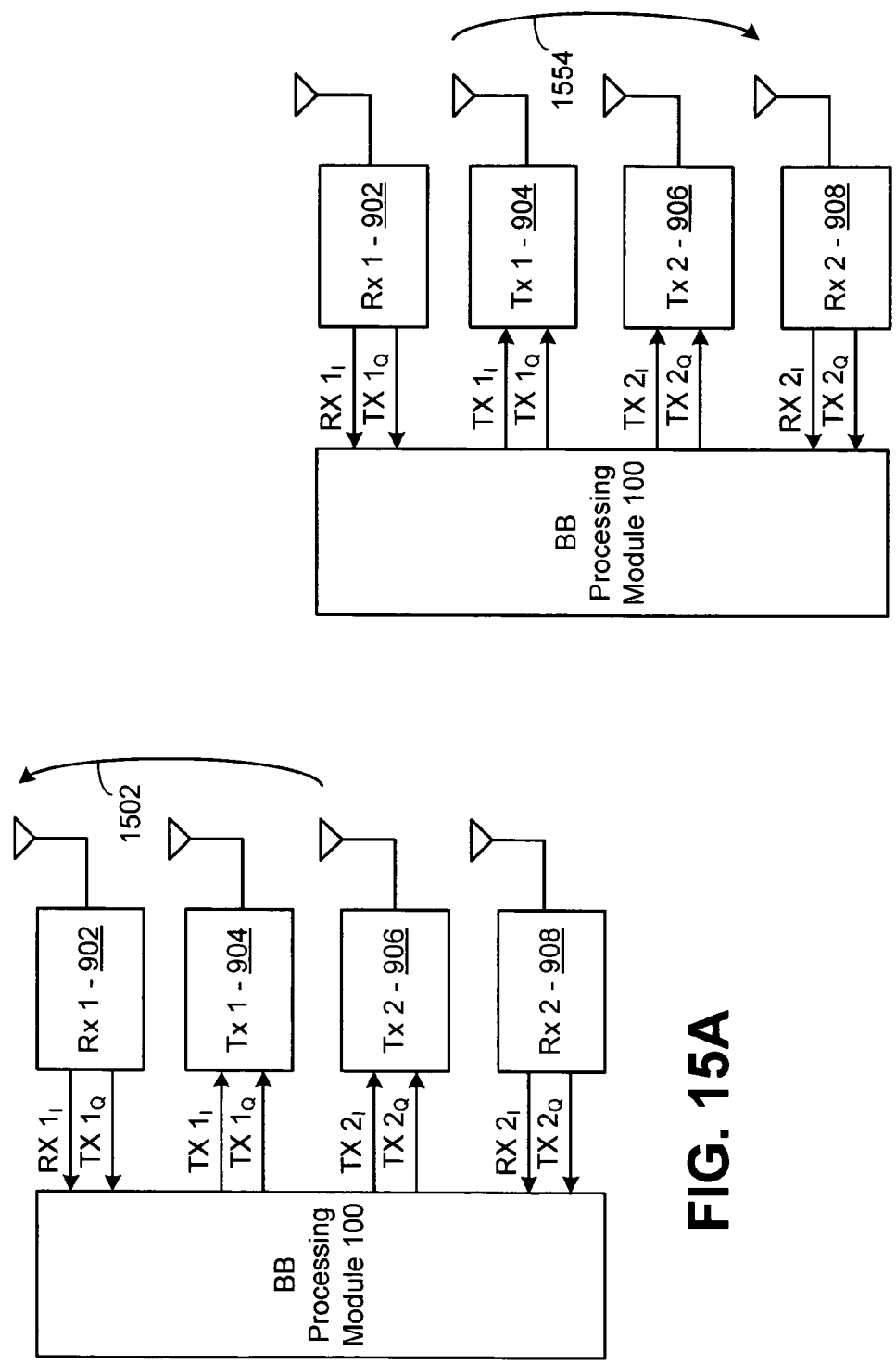

CROSS-CORE CALIBRATION IN A MULTI-RADIO SYSTEM

CROSS REFERENCE TO RELATED APPLICATION

This application is a Continuation-in-Part of U.S. Utility application Ser. No. 11/173,043, filed Jul. 1, 2005 now U.S. Pat. No. 7,356,325, which claims priority to U.S. Provisional Patent Application Ser. No. 60/668,050, filed Apr. 4, 2005, and also claims priority to U.S. Provisional Application Ser. No. 60/760,237 filed Jan. 19, 2006, all of which are incorporated herein by reference for all purposes.

BACKGROUND OF THE INVENTION

1. Technical Field of the Invention

This invention relates generally to communication circuitry and more particularly to radio frequency circuits that may be used within a wireless communication device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11 (Wireless Local Area Networks "WLANs"), Bluetooth (Wireless Personal Area Networks), advanced mobile phone services (AMPS), digital AMPS, global system for mobile communications (GSM), code division multiple access (CDMA), time division multiple access (TDMA), frequency division multiple access (FDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in RF transceiver (i.e., receiver and transmitter) or is coupled to an associated RF transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Currently developing operating standards require Multiple Input Multiple Output (MIMO) operations in which multiple receivers or transmitters of an RF transceiver operate simultaneously in a common band. RF transceivers of this type often times support higher order modulations such as QPSK, 8-PSK, 16-QAM, 64-QAM, 256-QAM, 1024-QAM, etc. In order to support these higher order modulations, calibration of the RF transceiver transmitters and receivers is extremely important. Therefore, a need exists for improvements in the calibration of multiple core RF transceivers.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 15A and 15B illustrate the baseband processing module and multiple transmitters and multiple receivers of the RF transceiver of FIG. 10 operating according to aspects of an embodiment of the present invention.

DETAILED DESCRIPTION OF THE INVENTION

Figure 1:
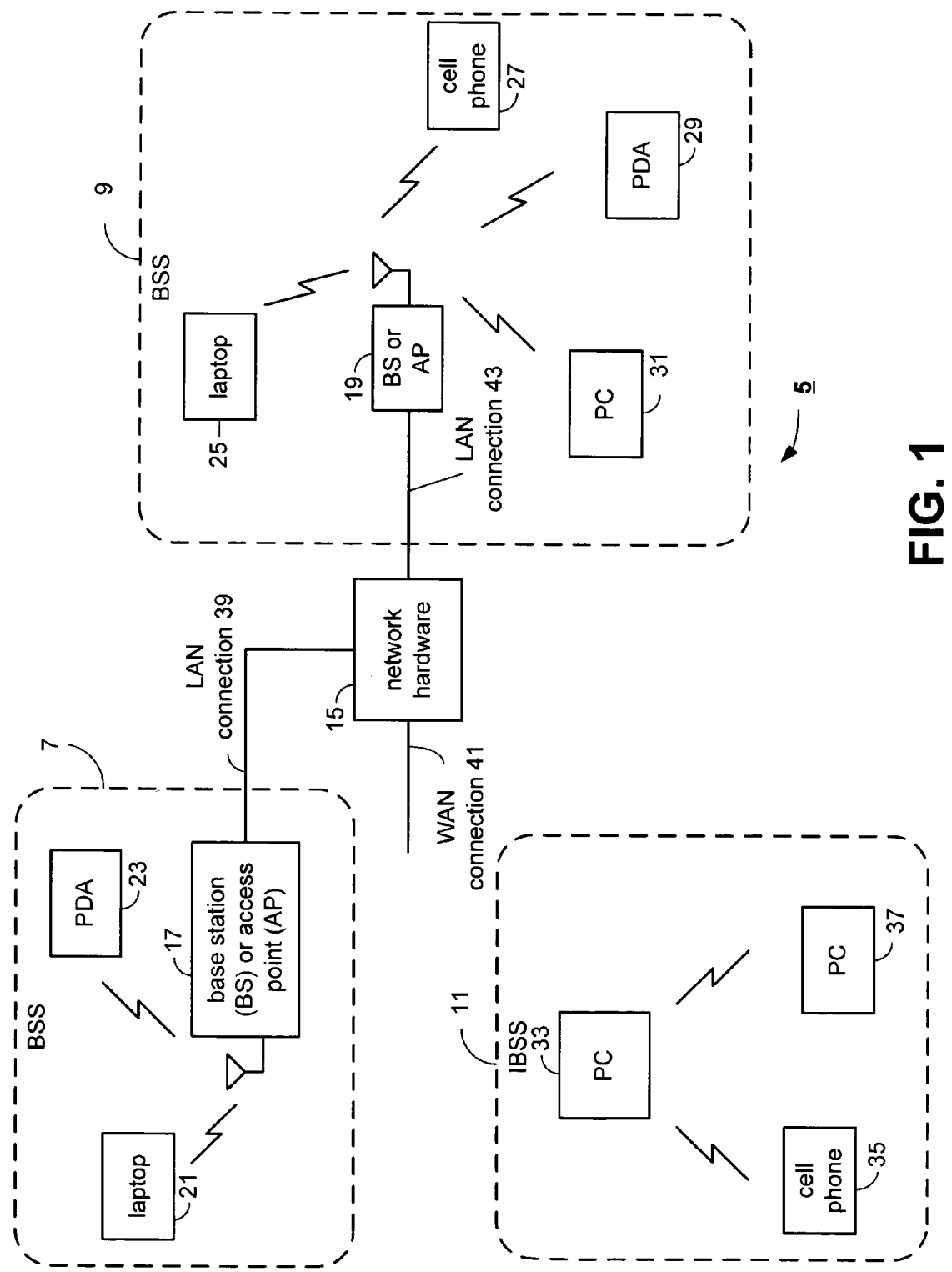
FIG. 1 is a schematic block diagram illustrating a wireless communication system in accordance with the present invention.

FIG. 1 is a schematic block diagram illustrating a communication system 5 that includes basic service set (BSS) areas 7 and 9, an independent basic service set (IBSS) 11, and a network hardware device 15. Each of the BSS areas 7 and 9 include a base station and/or access point 17, 19 and a plurality of wireless communication devices 21-23, 25-31. The IBSS 11 includes a plurality of wireless communication devices 33-37. Each of the wireless communication devices 21-37 may be laptop host computers 21 and 25, personal digital assistant hosts 23 and 29, personal computer hosts 31 and 33, and/or cellular telephone hosts 27 and 35.

The base stations or access points 17 and 19 are operably coupled to the network hardware 15 via local area network connections 39 and 43. The network hardware 15, which may be a router, switch, bridge, modem, system controller, et cetera, provides a wide area network connection 41 for the communication system 5. Each of the base stations or access points 17, 19 has an associated antenna or antenna array to communicate with the wireless communication devices in its area. Typically, the wireless communication devices register with a particular base station or access point 17, 19 to receive services from the communication system 5. For direct connections (i.e., point-to-point communications) within IBSS 11, wireless communication devices 33-37 communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver to facilitate direct and/or in-direct wireless communications within the communication system 5.

Still referring to FIG. 1, any of the wireless devices may be calibrated according to one or more embodiments of the present invention. According to the methods and structure of the present invention, a wireless device has multiple transceiver groups each of which has an RF transmitter and an RF receiver. The multiple RF transceiver groups are calibrated in at least one transmitter self calibration operation and a plurality of loopback calibration operations. The structure and operations of the wireless devices that are calibrated according to the present invention will be described further with reference to FIGS. 10-15.

Figure 2:
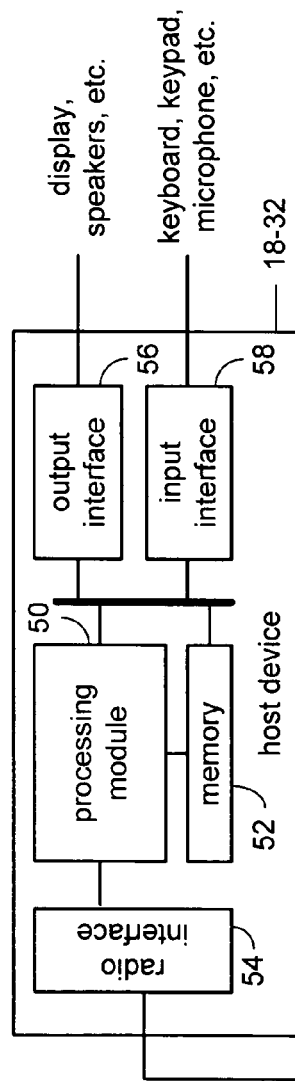
FIG. 2 is a schematic block diagram illustrating a wireless communication device in accordance with the present invention.
Figure 2:
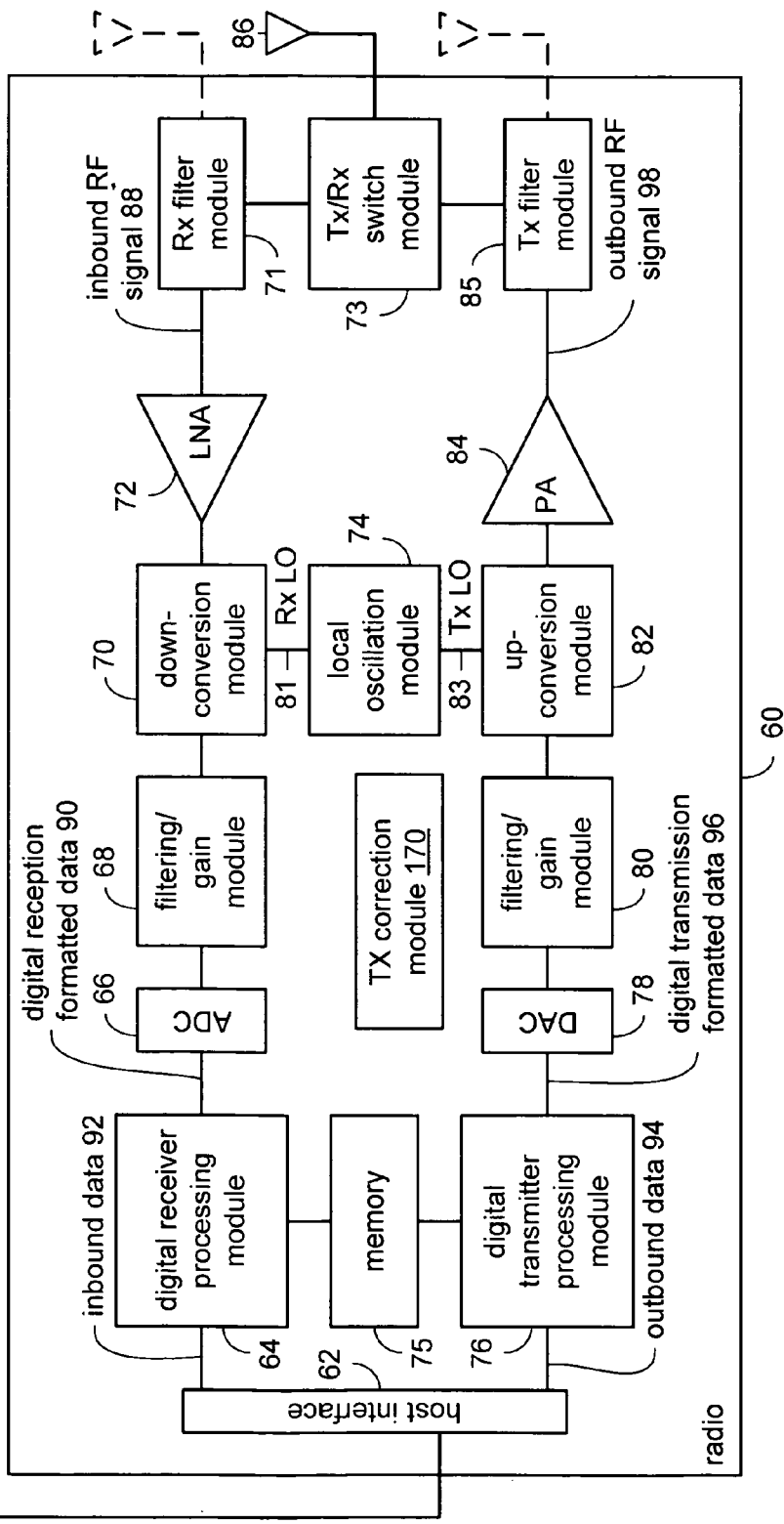

FIG. 2 is a schematic block diagram illustrating a wireless communication device that includes a host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes at least a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, analog-to-digital converter 66, filtering/gain module 68, down conversion module 70, low noise amplifier 72, local oscillation module 74, memory 75, digital transmitter processing module 76, digital-to-analog converter 78, filtering/gain module 80, up-conversion module 82, power amplifier 84, and an antenna 86. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, IEEE 802.11g, IEEE 802.11n, IEEE 802.15, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84 amplifies the RF signal to produce outbound RF signal 98. The antenna 86 transmits the outbound RF signal 98 to a targeted device such as a base station, an access point, and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provide the amplified inbound RF signal to the down conversion module 70, which directly converts the amplified inbound RF signal into an inbound low IF signal (or baseband signal) based on a receiver local oscillation provided by local oscillation module 74. The down conversion module 70 provides the inbound low IF signal (or baseband signal) to the filtering/gain module 68, which filters and/or adjusts the gain of the signal before providing it to the analog to digital converter 66.

The analog-to-digital converter 66 converts the filtered inbound low IF signal (or baseband signal) from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

Figure 3:
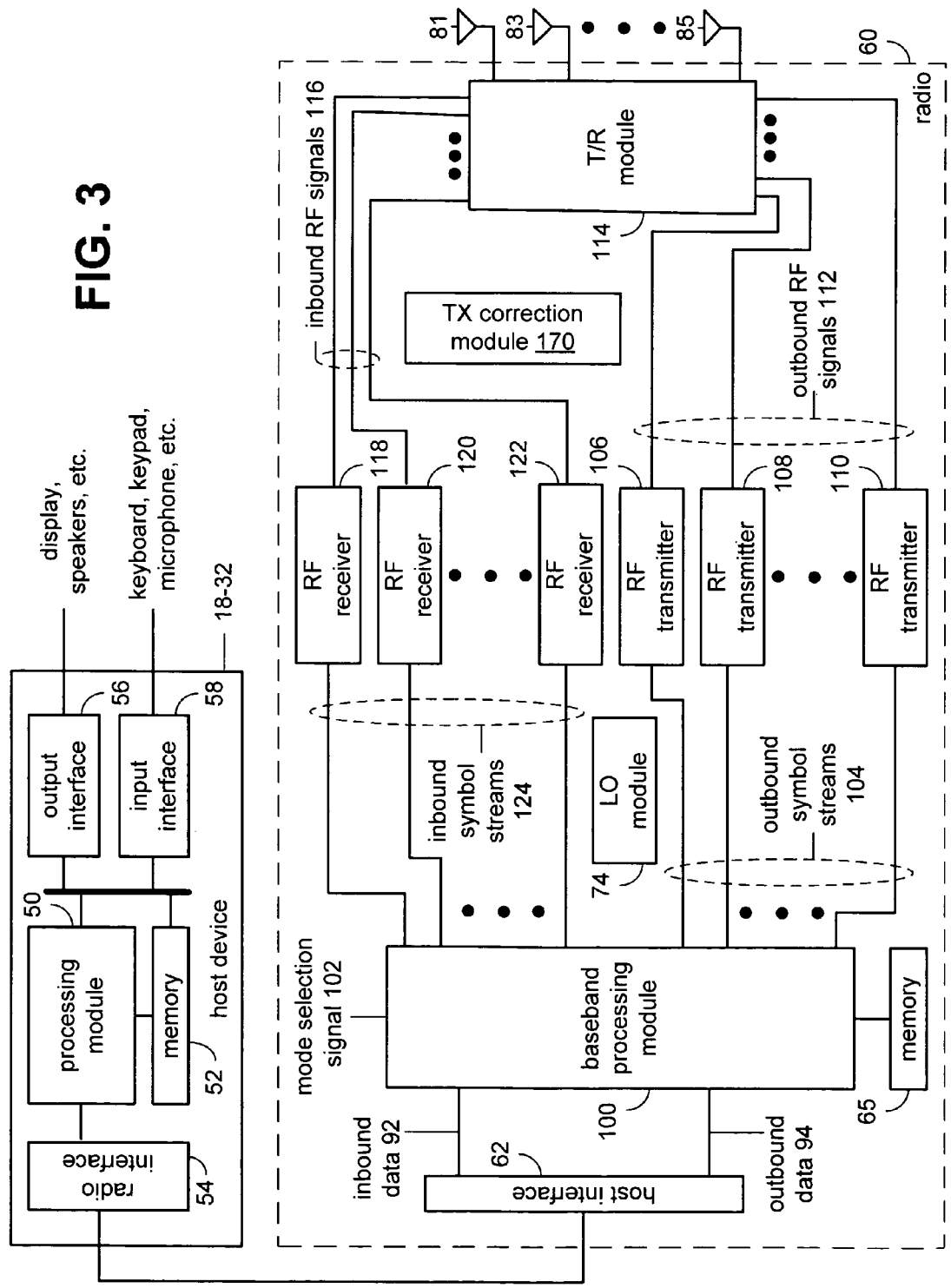
FIG. 3 is a schematic block diagram illustrating another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions may include, but are not limited to, digital intermediate frequency to baseband conversion, demodulation, constellation demapping, decoding, de-interleaving, fast Fourier transform, cyclic prefix removal, space, and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabitper-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3, or 4 antennas, the baseband processing module 100 will produce 2, 3, or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Still referring to FIG. 3, each of the RF receivers 118, 120, and 122 and RF transmitters 106, 108, and 110 may be calibrated and operate according to embodiments of the present invention. According to these embodiments, the radio 60 includes a plurality of RF transceiver groups. The plurality of RF transceiver groups are calibrated using transmitter self calibration operations and a plurality of loopback calibration operations. These operations will be described further with reference to FIGS. 10-15.

Figure 4:
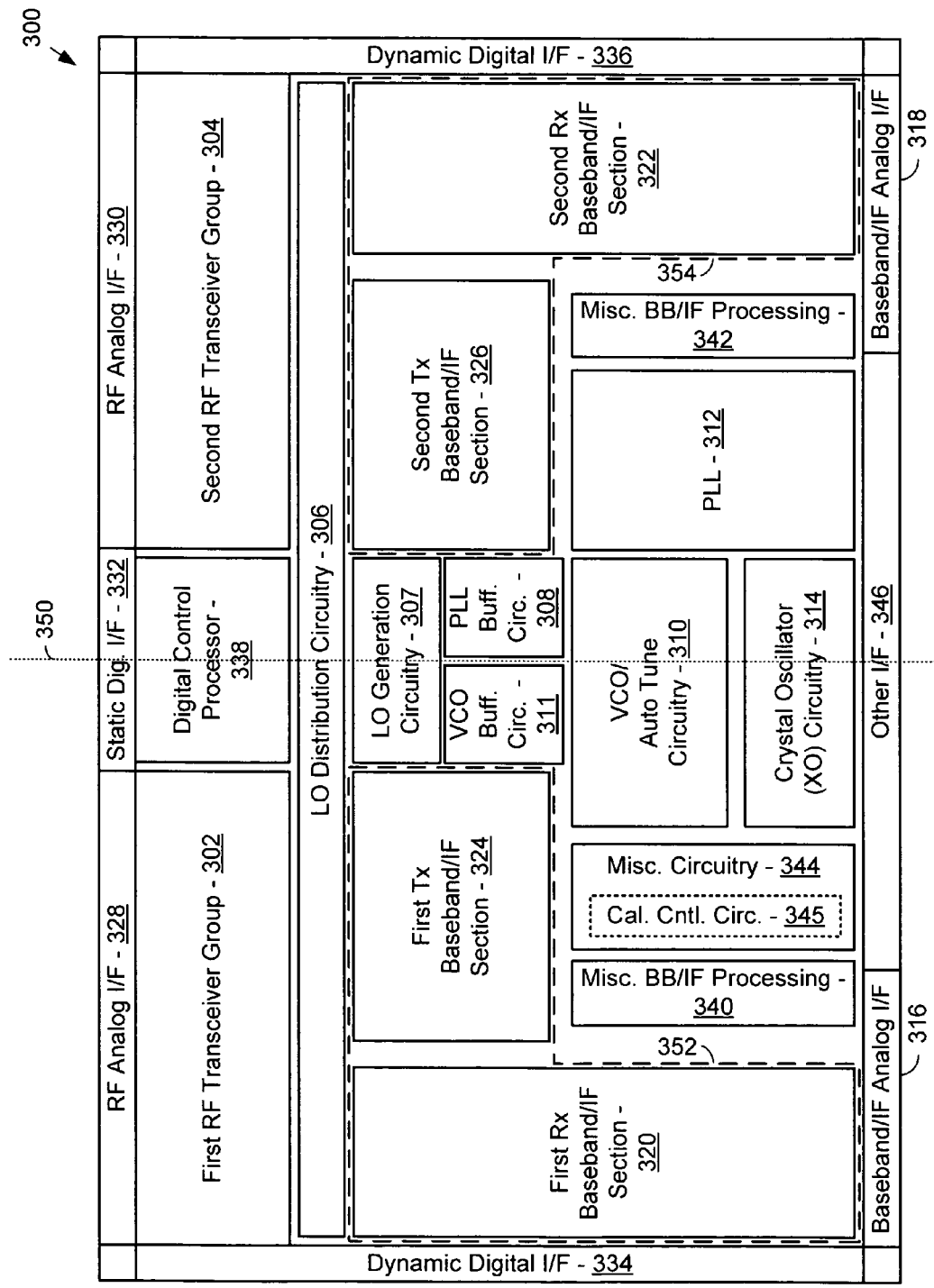
FIG. 4 is a schematic block diagram illustrating a Radio Frequency (RF) transceiver Integrated Circuit (IC) in accordance with the present invention.

FIG. 4 is a schematic block diagram illustrating a Radio Frequency (RF) transceiver Integrated Circuit (IC) in accordance with the present invention. The RF transceiver IC 300 includes a first transceiver group 302, a second RF transceiver group 304, a first baseband section 352, a second baseband section 354, local oscillation generation circuitry 307, and local oscillation distribution circuitry 306. Additional components of the RF transceiver IC 300 will be described subsequently herein.

The first baseband section 352 communicatively couples to the first RF transceiver group 302. Further, the second baseband section 354 communicatively couples to the second RF transceiver group 304. The local oscillation generation circuitry 307 generates a local oscillation and couples the local oscillation to the local oscillation distribution circuitry 306. The local oscillation distribution circuitry 306 operably couples to the local oscillation generation circuitry 307, to the first RF transceiver group 302, and to the second RF transceiver group 304.

According to a first aspect to the present invention, the second RF transceiver group 304 resides in substantial symmetry with the first RF transceiver group 302 about a center line of symmetry 350 of the RF transceiver IC 300. As the reader will appreciate, the center line of symmetry 350 of the RF transceiver IC 300 is not formed upon the RF transceiver IC 300 but relates to the layout of the components of the RF transceiver IC 300. Further, the center line of symmetry 350 of the RF transceiver IC 300 relates to the substantial but not absolute symmetrical relationship of the components. Thus, while the first RF transceiver group 302 and the second RF transceiver group 304 reside in substantial symmetry with one another about the center line of symmetry 350 of the RF transceiver IC 300, such symmetry may not be absolute or precise but merely substantial. Moreover, the center line of symmetry 350 of the RF transceiver IC 300 relates to the symmetrical relationship of components of the RF transceiver IC 300 and need not reside in a central location of the RF transceiver IC 300.

The first baseband section 352 includes a first RX baseband section 320 and a first TX baseband section 324. Further, the second baseband section 354 includes a second RX baseband section 322 and a second TX baseband section 326. According to another aspect of the present invention, the second baseband section 354 resides in substantial symmetry with the first baseband section 352 about the center line of symmetry 350 of the RF transceiver IC 300. As was the case with the symmetry of the first RF transceiver group 302 with respect to the second RF transceiver group 304, the symmetry of the baseband section 352 and 354 according to the present invention is substantial but may not be absolute or precise. According to another aspect to this symmetry, the first TX baseband section 324 may reside in substantial symmetry with relation to the second TX baseband section 326 about the center line of symmetry 350 of the RF transceiver IC 300. Further, the first RX baseband section 320 and the second RX baseband section 322 may reside in substantial symmetry with each other about the center line of symmetry 350 of the RF transceiver IC.

As is apparent upon review of FIG. 4, additional symmetrical and spatial relationships exist among the functional blocks of the RF transceiver IC 300. For example, the local oscillation generation circuitry 307 resides substantially along the center line of symmetry 350 of the RF transceiver IC 300. Such location of the local oscillation generation circuitry 307 in conjunction with the structure of the LO distribution circuitry 306 facilitates a uniform distribution of local oscillation signals to the first RF transceiver group 302 and to the second RF transceiver group 304. When the RF transceiver IC 300 supports Multiple Input Multiple Output (MIMO) communications, the timing and phase alignment of the RF signals produced by the first RF transceiver group 302 and the second RF transceiver group 304 is of enhanced importance. Thus, with the structure of the LO distribution circuitry 306 about the center line of symmetry 350 of the RF transceiver IC 300, distribution of precisely phase aligned local oscillations is supported.

The additional components of the RF transceiver IC 300 include a Phase Locked Loop (PLL) 312, PLL buffering circuitry 308, voltage controlled oscillator (VCO)/auto tune circuitry 310, VCO buffering circuitry 311, and crystal oscillator circuitry 314. The VCO/auto tune circuitry 310 and the crystal oscillator circuitry 314 operate in conjunction with the PLL 312 to produce inputs to PLL buffering circuitry 308 and the VCO buffering circuitry. The VCO buffering circuitry 311 provides input to the LO generation circuitry while the PLL buffering circuitry 308 provides an input to the PLL 312. The structure and operation of circuitry for generating a local oscillation apart from the teachings of the present invention is generally known and will not be described further herein.

The RF transceiver IC 300 further includes a digital control processor 338, miscellaneous baseband/IF processing 340, miscellaneous circuitry 344, miscellaneous baseband IF processing 342 and various input and output structures. As the reader will appreciate, the functional block diagram of FIG. 4 does not explicitly show connections between the various functional blocks of the RF transceiver IC 300. Based upon the function and operation of each of these functional blocks, each of the functional blocks will be coupled to various other of the functional blocks to support transmittal of communication signals, control signals, power, and ground between the various functional blocks. As the reader will appreciate, the connectivity between this various blocks is straight forward and needs no further description herein.

The RF transceiver IC 300 includes a static digital interface 332 that resides along an edge of the RF transceiver IC 300 that is substantially perpendicular to the center line of symmetry 350 of the RF transceiver IC 300. The RF transceiver IC 300 further includes a first dynamic digital interface 334 residing along a first edge of the RF transceiver IC 300 that is substantially parallel to the center line of symmetry 350 of the RF transceiver IC 300. Further, the RF transceiver IC 300 includes a second dynamic digital interface 336 residing along a second edge of the RF transceiver IC 300 that is substantially parallel to the center line of symmetry 350 of the RF transceiver IC 300. The digital control processor 338 communicatively couples to the static digital interface 332 and also resides along the center line of symmetry 350 of the RF transceiver IC 300 according to one aspect of the present invention.

The RF transceiver IC 300 includes a first baseband analog interface 316 that communicatively couples to the first baseband section 352 and resides along a first edge of the RF transceiver IC 300 oriented substantially perpendicular to the center line of symmetry 350 of the RF transceiver IC 300. The RF transceiver IC 300 further includes a second baseband analog interface 318 that communicatively couples to the second baseband section 354 and resides along the first edge of the RF transceiver IC 300. Moreover, the RF transceiver IC 300 includes a first RF analog interface 328 that communicatively couples to the first RF transceiver group 302 and resides along a second edge of the RF transceiver IC 300 oriented substantially perpendicular to the center line of symmetry 350 of the RF transceiver IC 300. The second edge resides opposite the first edge. Finally, the RF transceiver IC 300 includes a second analog interface 330 that communicatively couples to the second RF transceiver group 304 and resides along the second edge of the RF transceiver IC.

Still referring to FIG. 4, the RF transceiver 300 includes calibration control circuitry 345. The calibration control circuitry is operable to initiate calibration operations of the first RF transceiver group 302 and the second RF transceiver group 304. Initiation of these calibration operations may be in response to one or more direction(s) received from the baseband processing module 100. In initiating these operations, the calibration control circuitry 345 is operable to first initiate transmitter self calibration operations. With the transmitter self calibration operations, the transceivers of the first RF transceiver group 302 and the second RF transceiver group 304 are activated to transmit RF signals. The RF signals would typically be test signals that are measured at outputs of the RF transceiver groups 302 and 304. With the RF transceivers active, the calibration control circuitry 345 in combination with other components of the RF transceiver 300 and coupled baseband processing module 100 are operable to determine transmitter calibration settings for the RF transmitters of the first RF transceiver group 302 and the second RF transceiver group 304. Transmitter self calibration operations will be described further with reference to FIGs. 11, 13, and 14.

Still referring to FIG. 4, the calibration control circuitry 345 is also operable to initiate loopback calibration operations for each RF receiver of each of the first RF transceiver group 302 and the second RF transceiver group 304. The calibration control circuitry 345 may initiate the loopback calibration operations in response to direction(s) received from the baseband processing module 100. Assuming that the first RF transceiver group 302 and the second RF transceiver group 304 each includes a single RF transmitter and a single RF receiver, the calibration control circuitry 345 initiates first loopback calibration operations and second loopback calibration operations. With the first loopback calibration operations, calibration control circuitry 345 activates the RF transmitter of the second RF transceiver group 304 and the RF receiver of the first RF transceiver group 302. Transmissions from the RF transmitter of the second RF transceiver group 304 couple wirelessly, via a parasitic path, or via a dedicated signal path to the RF receiver of the first RF transceiver group 302. Based upon these coupled signals, the calibration control circuitry 345 (and other components of the RF transceiver) determines receiver calibration settings for the RF receiver of the first RF transceiver group 302.

With the second loopback calibration operations, calibration control circuitry 345 activates the RF transmitter of the first RF transceiver group 302 and the RF receiver of the second RF transceiver group 304. Transmissions from the RF transmitter of the first RF transceiver group 302 couple wirelessly, via a parasitic path, or via a dedicated signal path to the RF receiver of the second RF transceiver group 304. Based upon these coupled signals, the calibration control circuitry 345 (and other components of the RF transceiver) determines receiver calibration settings for the RF receiver of the second RF transceiver group 304.

According to the present invention, during the transmitter self calibration operations, each of the RF transmitter of the first RF transceiver group 302 and the RF transmitter of the second RF transceiver group 304 may be active concurrently. Because the transmitter self calibration operations only consider signals produced by the transmitters, such concurrent pre-distortion setting determinations do not conflict with one another. Further, during the first loopback calibration operations, the RF receiver of the second RF transceiver group 304 may also be active. Likewise, during the second loopback calibration operations, the RF receiver of the first RF transceiver group 302 may also be active.

Figure 5:
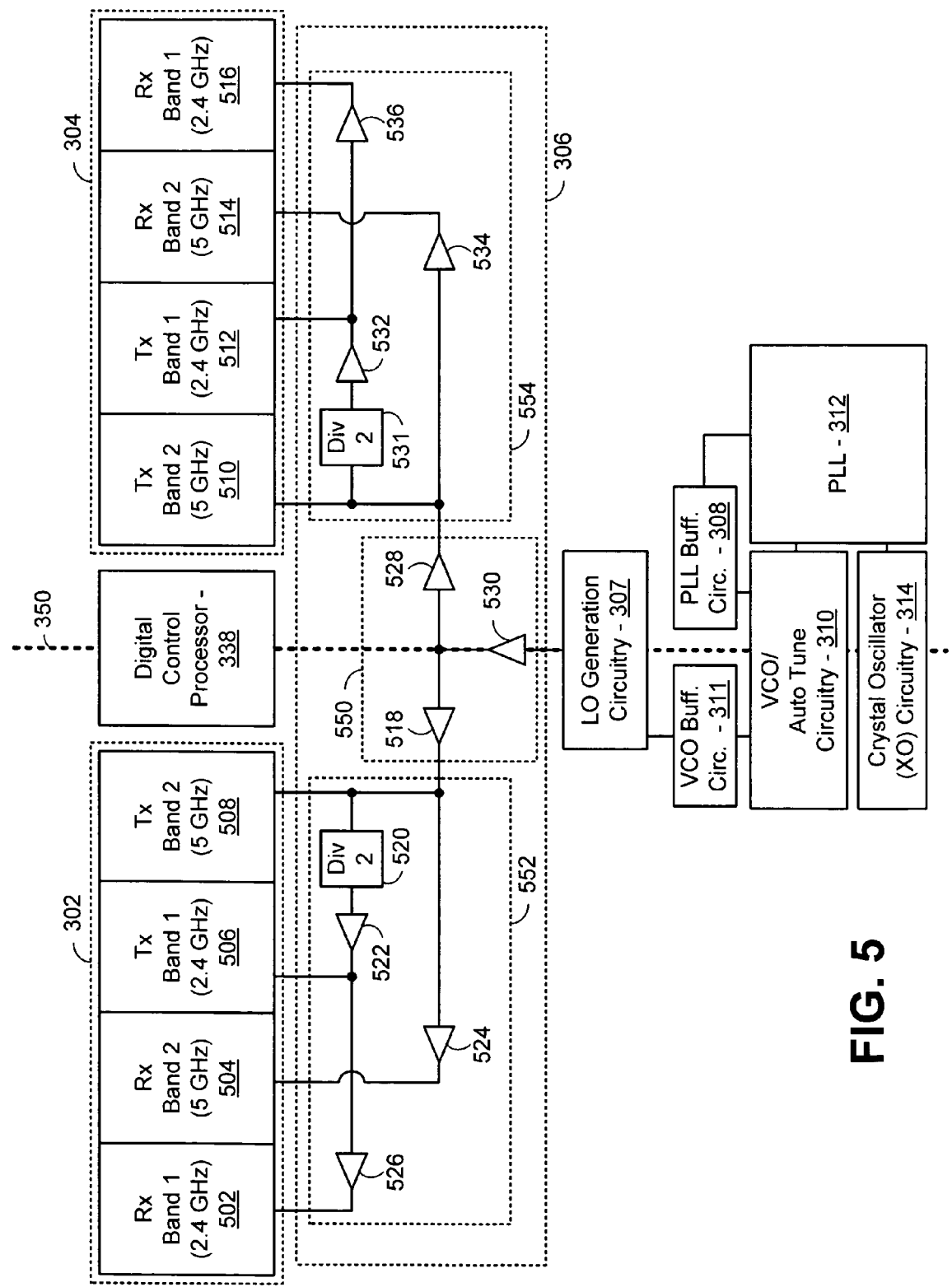
FIG. 5 is a schematic block diagram illustrating a portion of the RF transceiver IC of FIG. 4 in accordance with one embodiment of the present invention.

FIG. 5 is a schematic block diagram illustrating a portion of the RF transceiver IC of FIG. 4 in accordance with one embodiment of the present invention. With the portion of the RF transceiver FIG. 5, the first RF transceiver group 302 includes a first RF band transmitter 506, a first RF band receiver 502, a second RF band transmitter 508, and a second RF band receiver 504. Likewise, the second RF transceiver group 304 includes a first RF band transmitter 512, a first RF band receiver 516, a second RF band transmitter 510, and a second RF band receiver 514. According to the particular embodiment of FIG. 5, the second RF band is the 5 GHz band while the first RF band is the 2.4 GHz band. As the reader will appreciate, wireless local area network (WLAN) RF transceivers are now called upon to operate in both the 5 GHz band and the 2.4 GHz band. Thus, the RF transceiver IC 300 of the present invention supports communications in each of these bands using respective transmitters and receivers for each band.

As is illustrated in FIG. 5, the first RF band transmitter 506 of the first RF transceiver group 302 resides in substantial symmetry with the first RF band transmitter 512 of the second RF transceiver group 304 about the center line of symmetry 350 of the RF transceiver IC 300. Further, the second RF band transmitter 508 of the first RF transceiver group 302 resides in substantial symmetry with the second RF band transmitter 510 of the second RF transceiver group 304 about the center line of symmetry 350 of the RF transceiver IC. Moreover, the first RF band receiver 502 of the first RF transceiver group 302 resides in substantial symmetry with the first RF band receiver 516 of the second RF transceiver group 304 about the center line of symmetry 350 of RF transceiver IC 300. Finally, the second RF band receiver 504 of the first RF transceiver group 302 resides in substantial symmetry with the second RF band receiver 514 of the second RF transceiver group 304 about the center line of symmetry 350 of the RF transceiver IC 300.

With the construct of FIG. 5, a sequential order of position of the first RF transceiver group 302 components from the center line of symmetry 350 of the RF transceiver IC 300 is the second RF band transmitter 508, the first RF band transmitter 506, the second RF band receiver 504, and the first RF band receiver 502. Further, a sequential order of position of the second RF transceiver group 304 components from the center line of symmetry 350 of the RF transceiver IC 300 is the second RF band transmitter 510, the first RF band transmitter 512, the second RF band receiver 514, and the first RF band receiver 516. With this construct, the transmitter/receiver pairs in a common band are not adjacent to one another. This provides spatial separation between these components to reduce coupling of TX/RX signals from a transmitter to a receiver in the common band. However, such a construct causes the local oscillation distribution to be slightly more complicated as contrasted to the structure of FIG. 6, which will be described further herein.

Further shown in FIG. 5 are the crystal oscillator 314, the VCO/auto tune circuitry 310, the VCO buffering circuitry 311, the PLL 312, the PLL buffering circuitry 308, the local oscillation generation circuitry 307, and the local oscillation distribution circuitry 306. According to another aspect to the present invention, the local oscillation generation circuitry 307 is operable to produce a local oscillation at its output. Further, the local oscillation distribution circuitry 306 operably couples to the local oscillation generation circuitry 307, to the first RF transceiver group 302, and to the second RF transceiver group 304. The local oscillation distribution circuitry 306 includes a splitting circuit 550 that is operable to receive the local oscillation from the local oscillation generation circuitry 307 and to produce multiple copies of the local oscillation. In particular, the splitting circuit 550 includes drivers 518, 528, and 530. The input to of driver 530 is the local oscillation produced by the local oscillation generation circuitry 307. Further, each of drivers 518 and 528 produces a copy of the local oscillation that is received by driver 530. As is shown, the splitting circuit 550 and the local oscillation generation circuitry 307 reside substantially along the center line of symmetry 350 of the RF transceiver IC 300.

The local oscillation distribution circuitry 306 further includes a first distribution portion 552 that couples to the splitting circuit 550 and that is operable to produce a first local oscillation corresponding to the first RF band based upon local oscillation, to produce a second local oscillation corresponding to the second RF band based upon the local oscillation, and to provide both the first local oscillation and the second local oscillation to the first RF transceiver group 302. Likewise, the second distribution portion 554 couples to the splitting circuit 550 and is operable to produce both a first local oscillation corresponding to the first RF band based upon local oscillation and a second local oscillation corresponding to the second RF band based upon the local oscillation. Further, the second distribution portion 554 is operable to provide the first local oscillation and the second local oscillation to the second RF transceiver group 304. By locating the local oscillation generation circuitry 307 and the splitting circuitry 550 substantially along the center line of symmetry 350 of the RF transceiver IC 300, and by constructing the splitting circuit 550 with substantial symmetry about the center line of symmetry 350 of the RF transceiver IC 300, multiple copies of the local oscillation are phase matched upon their receipt by each of the first distribution portion 552 and the second distribution portion 554.

As is shown, the components of the first distribution portion 552 and the second distribution portion 554 include drivers and divide-by-two elements. In particular, the first distribution portion 552 includes divide-by-two element 520 and drivers 522, 524 and 526. Further, the second distribution portion 554 includes divide-by-two element 531 and drivers 532, 534, and 536. As is illustrated, the components of the first distribution portion 552 and the second distribution portion 554 reside in substantial symmetry with one another about the center line of symmetry 350 of the RF transceiver IC 300. Because both the first RF transceiver group 302 components and the second RF transceiver group 304 components also reside in substantial symmetry about the center line of symmetry 350 of the RF transceiver IC, distribution of both the first local oscillation and the second local oscillation to the various components of these RF transceiver groups 302 and 304 are time and phase aligned.

Still referring to FIG. 5, the RF transmitters 506 and 508 and RF receivers 502 and 504 of the first RF transceiver group 302 may be calibrated according to the present invention, as will be further described with reference to FIGS. 10-15. The RF transmitters 510 and 512 and the RF receivers 514 and 516 of the second RF transceiver group 304 may also be calibrated according to the present invention. The reader should appreciate, that the designation of RF transmitters and RF receivers as being members of particular RF transceiver groups is for illustrative purposes only and does not limit the scope of the claims of the present invention. A minimum requirement of an RF transceiver group is that it has at least one RF receiver and at least one RF transmitter. Thus, the RF transceiver group 302 could be characterized as having an RF transceiver group that includes RF receiver 502 and RF transmitter 504 and a second RF transceiver group that includes RF receiver 506 and RF transmitter 508. Either of these RF transceiver groups may be calibrated according to the present invention.

The LO generation circuitry 307 produces an LO signal and provides the LO signal to the LO distribution circuitry 306. The LO distribution circuitry 306 includes the LO splitting circuit 550 and distribution portions circuitry 552 and 554. The LO splitting circuitry 550 includes drivers 518, 528, and 530. During normal operations, the RF transceiver 300 transmits using both RF transceiver groups 302 and 304. Likewise, during receive operations the RF transceiver uses both RF transceiver group 302 and RF transceiver group 304. Thus, during normal operations, all of drivers 518, 528, and 530 of LO generation splitting circuit 550 are active.

With the calibration operations of the present invention, the LO generation circuitry 307 and the LO distribution circuitry are loaded substantially the same as they are loaded during transmit operations and receive operations, i.e., of driver 518, 528, and 530 active. Thus, according to the present invention, the RF transceiver groups 302 and 304 of the RF transceiver are calibrated with each of the drivers 518, 528, and 530 also active. Thus, in such case, the loading on the LO generation circuitry 307 is substantially equal during each of transmitter self calibration operations, first loopback calibration operations, second loopback calibration operations, data transmission operations, and data receipt operations. Further, when the RF transceiver includes more than two RF transceiver groups, the loading on the LO generation circuitry 307 is substantially equal during all of transmitter self calibration operations, a plurality of loopback calibration operations, data transmission operations, and data receipt operations.

Figure 6:
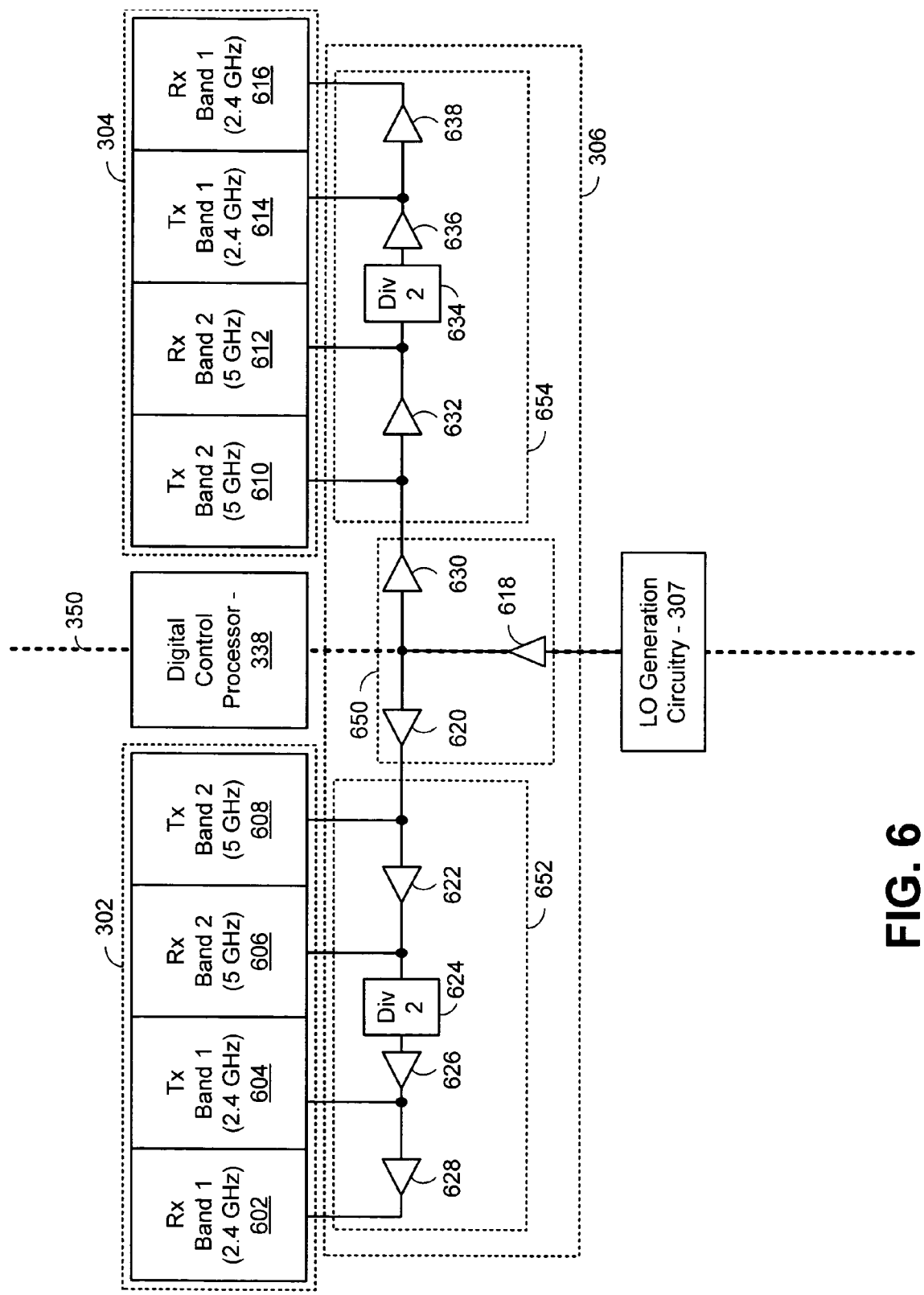
FIG. 6 is a schematic block diagram illustrating a portion of the RF transceiver IC of FIG. 4 in accordance with another embodiment of the present invention.

FIG. 6 is a schematic block diagram illustrating a portion of the RF transceiver IC of FIG. 4 in accordance with another embodiment of the present invention. With the alternate embodiment of FIG. 6, the location of the components of the RF transceiver group 302 and the second RF transceiver group 304 differ from the locations of corresponding components of FIG. 5. FIG. 6 does not include components of the local oscillation circuitry other than the LO generation circuitry 307 and the LO distribution circuitry 306. Of course, the reader will appreciate that the components are not shown for simplicity purposes but are required in the full construct of the RF transceiver IC 300.

With the embodiment of FIG. 6, a sequential order of position of the first RF transceiver group 302 components from the center line of symmetry 350 of the RF transceiver IC 300 is the second RF band transmitter 608, the second RF band receiver 606, the first RF band transmitter, and the first RF band receiver 602. Likewise, a sequential order of position from the center line of symmetry 350 of the RF transceiver IC of the components of the second RF transceiver group 304 is the second RF band transmitter 610, the second RF band receiver 614, the first RF band transmitter 614, and the first RF band receiver 616. As contrasted to the structure of FIG. 6, the transmitter and receiver pairs operating in a common band are adjacent one another instead of being separated by an intervening component.

While the structure may result in additional coupling of a transmit signal to its adjacent common RF band receiver, the structure allows a reduced complexity of local oscillation distribution circuitry 306 to be employed. As is shown, the local oscillation splitting circuit 650 includes drivers 618, 620 and 630. The structure of the splitting circuit 650 may be identical to that of the splitting circuit 550 of FIG. 5. The splitting circuit 650 preferably resides along the center line of symmetry 350 of the RF transceiver IC 300. Further, the drivers 620 and 630 may be symmetrically located about the center line of symmetry 350 of the RF transceiver IC 300. The first distribution portion 652 includes drivers 622, divide-by-two element 624, driver 626, and driver 628. The second distribution portion 654 includes driver 632, divide-by-two element 634, driver 636, and driver 638. As contrasted to the structure of the splitting circuit 552 of FIG. 5, the structure of the splitting circuit 652 of FIG. 6 is less complicated, may consume less power, and may require less floor space for construction and routing.

Still referring to FIG. 6, the RF transceiver groups 302 and 304 may be calibrated according to the present invention. In such calibration operations, the loading on LO generation circuitry 307 is substantially equal during all of transmitter calibration operations, during receiver calibration operations, during normal transmit operations, and during normal receive operations of the RF transceiver.

Figure 7:
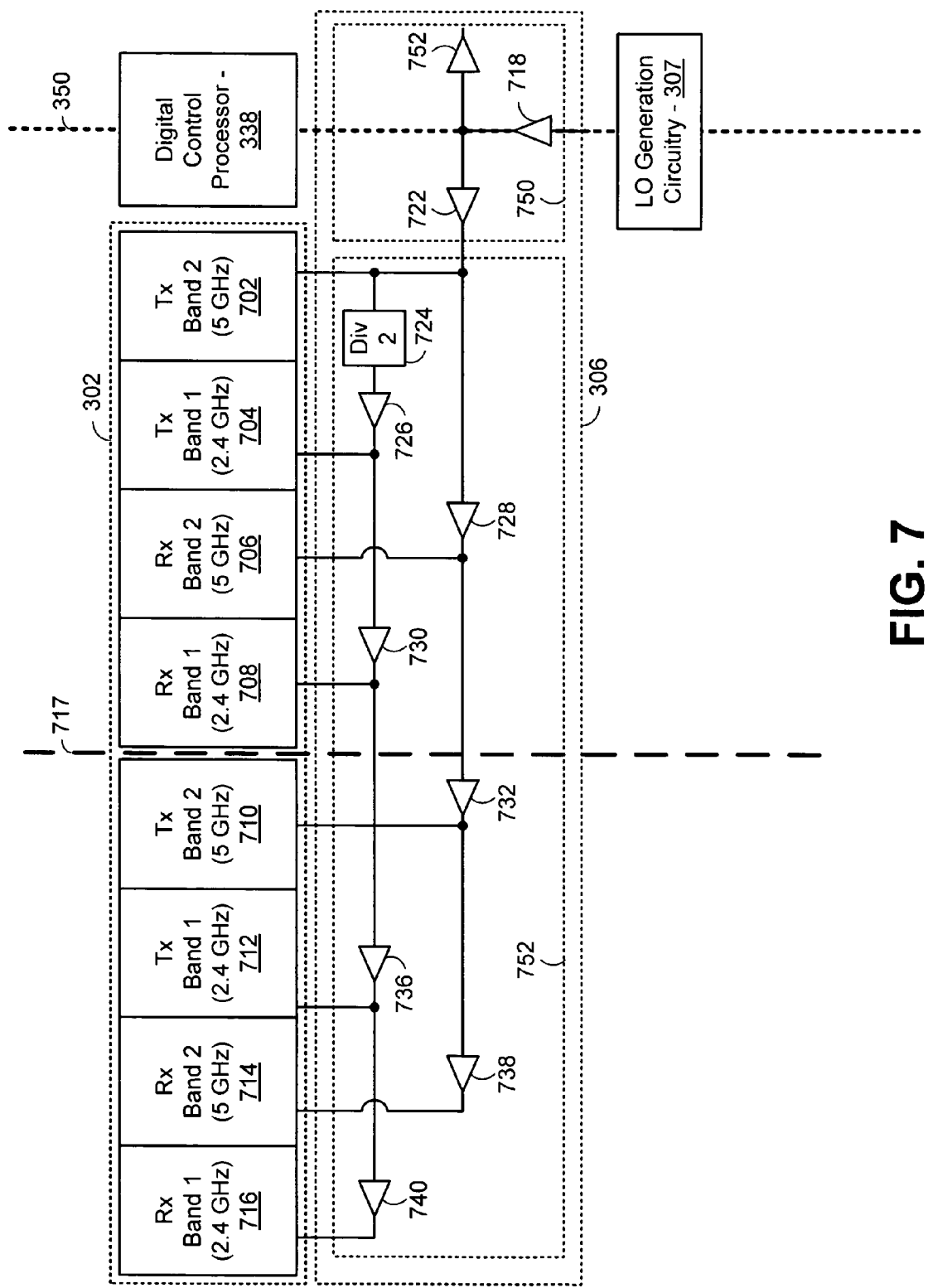
FIG. 7 is a schematic block diagram illustrating a portion of an RF transceiver IC or multiple RF transceiver ICs in accordance with still another embodiment of the present invention.

FIG. 7 is a schematic block diagram illustrating a portion of an RF transceiver IC or multiple RF transceiver ICs in accordance with still another embodiment of the present invention. In particular, FIG. 7 illustrates how the structure of a first RF transceiver group 302 may be expanded to include additional RF receivers and RF transmitters. The structure of FIG. 7 is similar to the structure of FIG. 5 with regard to the orientation of RF transmitters and RF receivers in the two RF bands. In such case, the first RF transceiver group 302 includes a second RF band transmitter 702, a first RF band transmitter 704, a RF second band receiver 706, a first RF band receiver 708, second RF band transmitter 710, a first RF band transmitter 712, a second RF band receiver 714, and a first RF band receiver 716. The components of the first RF transceiver group 302 may be present on a single RF transceiver IC, with line 717 separating a left slice (elements to the left of line 717) and a right slice (elements to the right of line 717). Alternatively, these components may be on separate RF transceiver ICs with the separation between the ICs along line 717. With the structure of FIG. 7 extended to a second RF transceiver group, complimentary and corresponding transmitter and receiver components of the second RF transceiver group may be included. The structure of the first RF transceiver group 302 and the second RF transceiver group (not shown) may be substantially symmetric about the center line of symmetry 350 of the RF transceiver IC 300.

The local oscillation distribution circuitry includes the splitting circuits 750 and a first distribution portion 752. In such case, the splitting circuit 750 includes drivers 718, 720, and 722. The first distribution portion 752 includes divide-by-two element 724 and drivers 726, 728, 730, 732, 736, 738, and 740. When the first RF transceiver group 302 resides on a single RF transceiver IC, all of the elements of the first distribution portion 752 reside on the single RF transceiver IC. However, if the components of the first RF transceiver group 302 extend across multiple ICs, the components of the first distribution portion 752 will reside upon multiple RF transceiver ICs with separation at line 716.

Still referring to FIG. 7, the RF transceiver group 302 may be calibrated according to the present invention. In such calibration operations, the loading on LO generation circuitry 307 is substantially equal during the calibration operations and during the normal transmit and receive operations of the RF transceiver.

Figure 8:
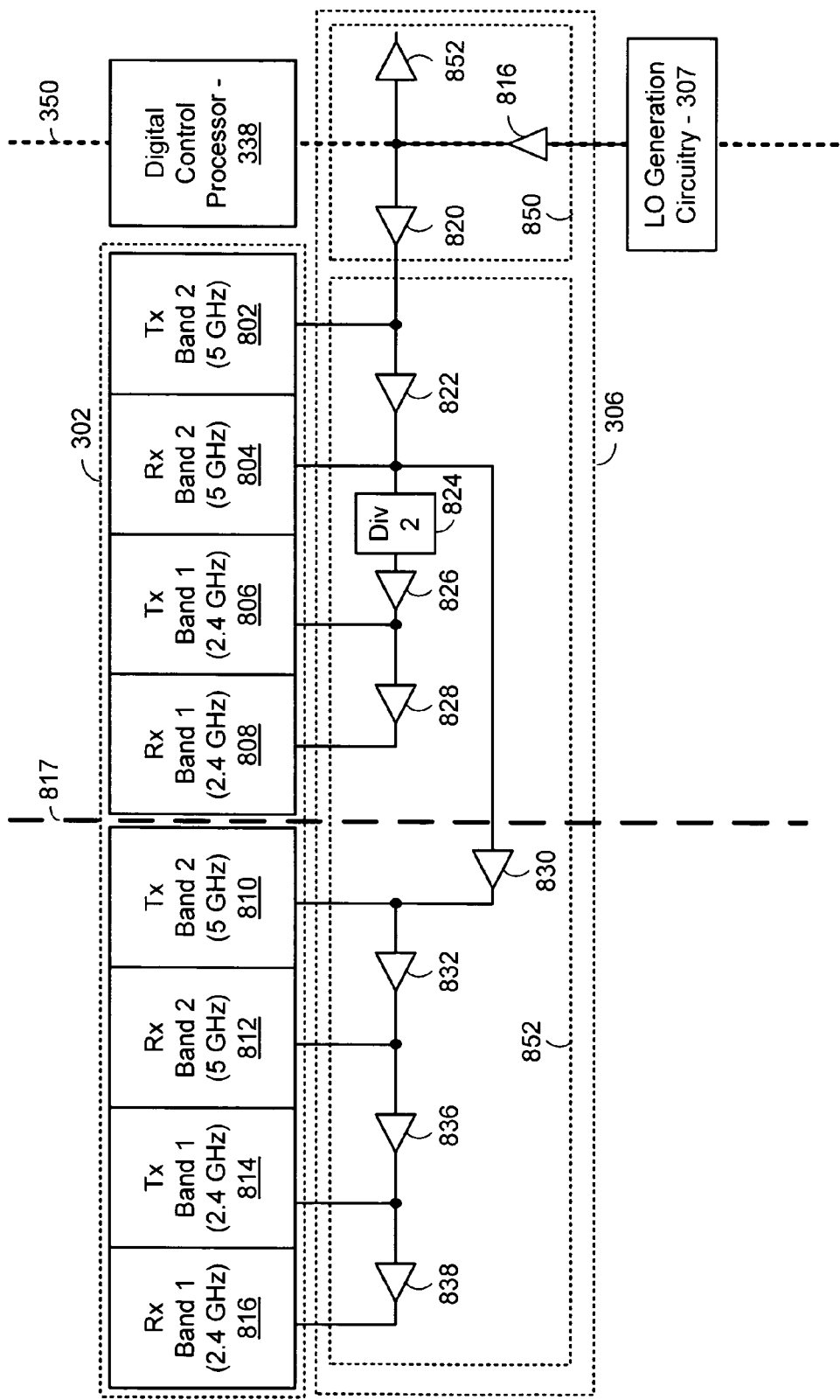
FIG. 8 is a schematic block diagram illustrating a portion of an RF transceiver IC or multiple RF transceiver ICs in accordance with yet another embodiment of the present invention.

FIG. 8 is a schematic block diagram illustrating a portion of an RF transceiver IC or multiple RF transceiver ICs in accordance with yet another embodiment of the present invention. The structure of FIG. 8 may reside on a single RF transceiver IC or upon multiple RF transceiver ICs and generally corresponds to the structure of FIG. 6. When the structure of FIG. 8 resides on a single RF transceiver IC, all of the components of the first RF transceiver group 302 reside upon the single RF transceiver IC with line 817 separating a left slice from a right slice. However, when the components illustrated in FIG. 8 reside on multiple RF transceiver ICs (e.g., along dividing line 817), some of the components of the first RF transceiver group 302 and distribution portion 852 reside on a first RF transceiver IC while other components of the first RF transceiver group 302 and distribution portion 852 reside on a second RF transceiver IC.

In the construct of FIG. 8, a different ordering of the TX and RX blocks of the first RF transceiver group 302 is shown. In such case, the first RF transceiver group 302 includes a second RF band transmitter 802, a second RF band receiver 804, a first RF band transmitter 806, a first RF band receiver 808, a second RF band transmitter 810, a second RF band receiver 812, a first RF band transmitter 814, and a first RF band receiver 816. Also shown in FIG. 8 are local oscillation generation circuitry 307 and local oscillation distribution circuitry 306. The local oscillation distribution circuitry 306 corresponding to the first RF transceiver group 302 includes splitting circuit 850 and first distribution portion 852. The splitting circuit 850 includes drivers 816, 820, 852. The first distribution portion 852 includes drivers 822, 826, 830, 832, 836, and 838. The first distribution portion 852 also includes divide by 2 element 824. Of course, since the components shown in FIG. 8 correspond to only one-half of an RF transceiver, a second distribution portion (not shown) would reside substantially symmetric about the center line of symmetry at 350 of the RF transceiver IC.

Still referring to FIG. 8, as was previously described with reference to FIGS. 5, 6 and 7, the loading on the LO generation circuitry 307 by the LO distribution circuitry 306 is substantially equal during all of the transmitter self calibration operations, a plurality of loopback calibration operations, data transmission operations, and data receipt operations.

Figure 9:
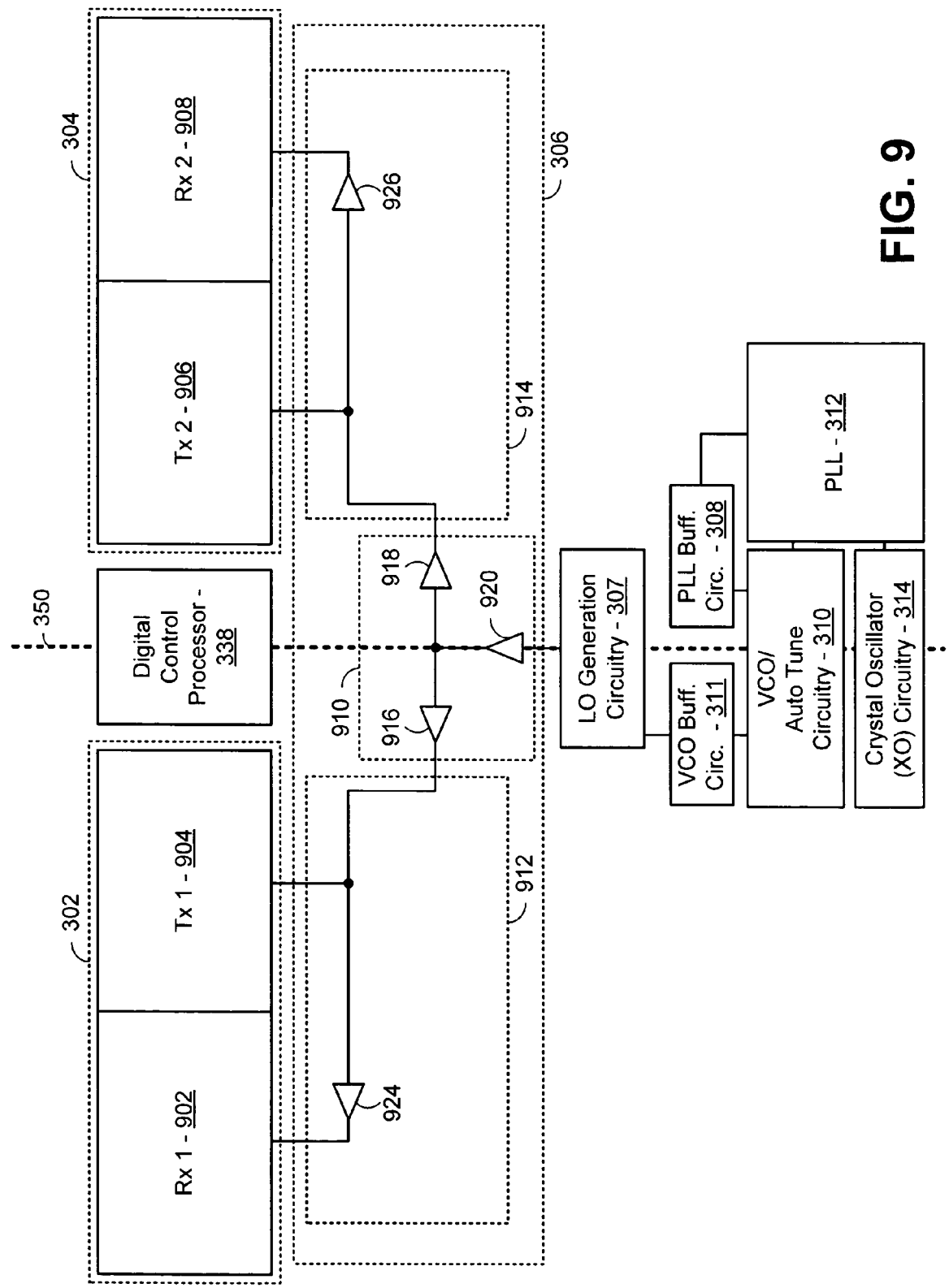
FIG. 9 is a schematic block diagram illustrating a portion of an RF transceiver constructed and operating in accordance still another embodiment of the present invention.

FIG. 9 is a schematic block diagram illustrating a portion of an RF transceiver constructed and operating in accordance with still another embodiment of the present invention. The RF transceiver includes a plurality of components previously described with reference to FIGS. 5-8 that have retained common numbering. The RF transceiver 300 includes first RF transceiver group 302 having an RF transmitter 904 and an RF receiver 902. Further, the RF transceiver includes a second RF transceiver group 304 having an RF transmitter 906 and an RF receiver 908. The RF transceiver also includes local oscillation generation circuitry 307 and local oscillation distribution circuitry 306. The local oscillation generation circuitry 307 and the local oscillation distribution circuitry 306 may be referred to together as local oscillation circuitry. The local oscillation circuitry is operable to selectively produce local oscillations to the first RF transceiver group 302 and to the second RF transceiver group 304.

The LO distribution circuitry includes LO splitting circuitry 910 having drivers 916, 918, and 920. Further, the LO distribution circuitry 306 includes first distribution circuitry 912 having driver 924 and second distribution circuitry 914 having driver 926. According to the present invention, drivers 916, 918, and 920 are active during all of self calibration operations, first loopback calibration operations, second loopback calibration operations, data transmission operations, and data receipt operations. Due to this substantially equal loading, the LO generation circuitry will be configured during calibration exactly as it is during data transmission and data receipt operations. Such configuration allows the components of the RF transceiver groups 302 and 304 to be accurately calibrated.

Figure 10:
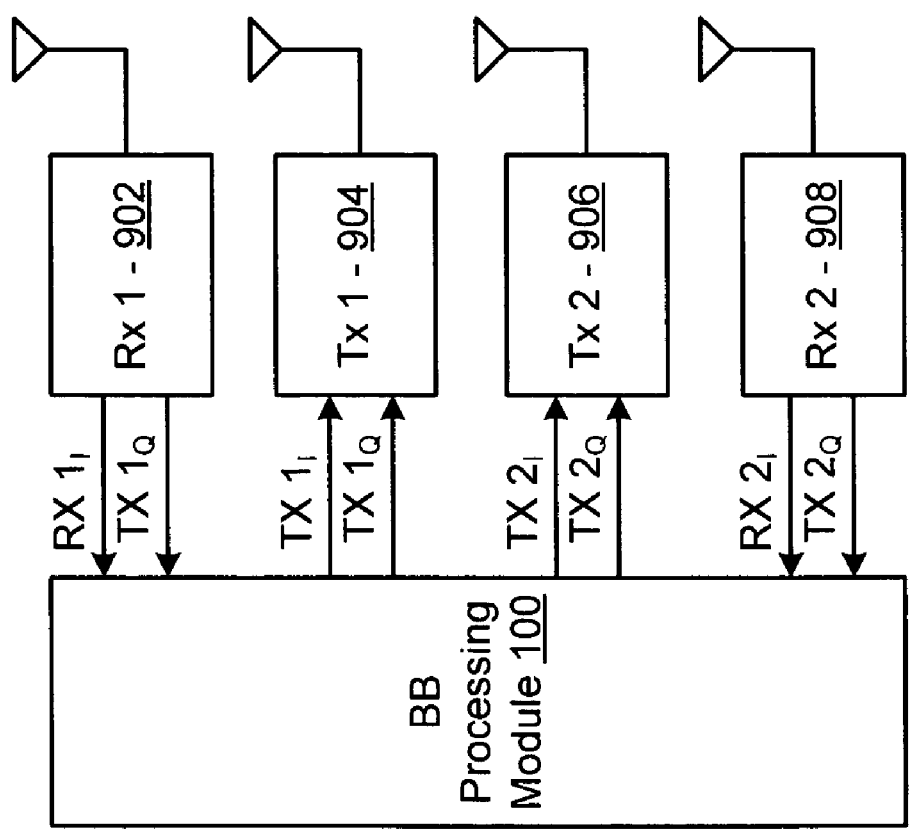
FIG. 10 is a block diagram illustrating an interface between a baseband processing module and multiple transmitters and multiple receivers of an RF transceiver constructed and operating according to the present invention.

FIG. 10 is a block diagram illustrating an interface between a baseband processing module and multiple transmitters and multiple receivers of an RF transceiver constructed and operating according to the present invention. The RF transceiver includes RF receiver 902 and RF transmitter 904 of a first RF transceiver group. Further, the RF transceiver includes an RF transmitter 906 and an RF receiver 908 of a second RF transceiver group. The RF transmitter 904 receives in-phase (TX $1_I$) and quadrature (TX $1_Q$) transmit signals from baseband processing module 100. Referring to both FIGS. 4 and 10, transmit signals are not received directly from the baseband processor 100 but flow through the baseband interface 316 and the first TX baseband processing section 324. Likewise, the first RF receiver 902 produces in-phase (RX $1_I$) and quadrature (RX $1_Q$) signals to baseband processing module 100 via RX baseband processing section 320 and to the baseband interface 316. Likewise, RF transmitter 906 receives in-phase (TX $2_I$) and quadrature (TX $2_Q$) transmit signals from baseband processing module 100 via the baseband interface 318 and the second TX baseband processing section 326. Likewise, the second RF receiver 908 produces in-phase (RX $2_I$) and quadrature (RX $2_Q$) signals to baseband processing module 100 via RX baseband processing section 320 and to the baseband interface 318.

Because of its operational requirements, e.g., higher order modulation requirements, it is very important that baseband processing module 100 and the RF transceiver have balanced I (in phase) and Q (quadrature) components and for all of the components to operate linearly. Thus, according to the present invention, transmitter self calibration operations and receiver loopback calibration operations are performed using the receivers and transmitters of the RF transceiver. Generally, the transmitter of one RF transceiver core is used to calibrate the receiver of another RF transceiver core during loopback calibration operations. As will be further described with reference to FIG. 15, both the transmitter self calibration operations and the loopback calibration operations are performed while the RF transceiver is configured in a nearly normal operational state. In this nearly operational state, the transmissions of one of the RF transmitters, e.g., 904, are received by one of the RF receivers, e.g., 908, during the loopback calibration operations. The loopback of calibration signals may be via a wireless path that includes coupled antennas, via a parasitic path, or via a dedicated feedback path. Performing loopback calibration operations according to the present invention causes the separate I and Q phases to be closely balanced and high linearity of the RF transceiver.

Figure 11:
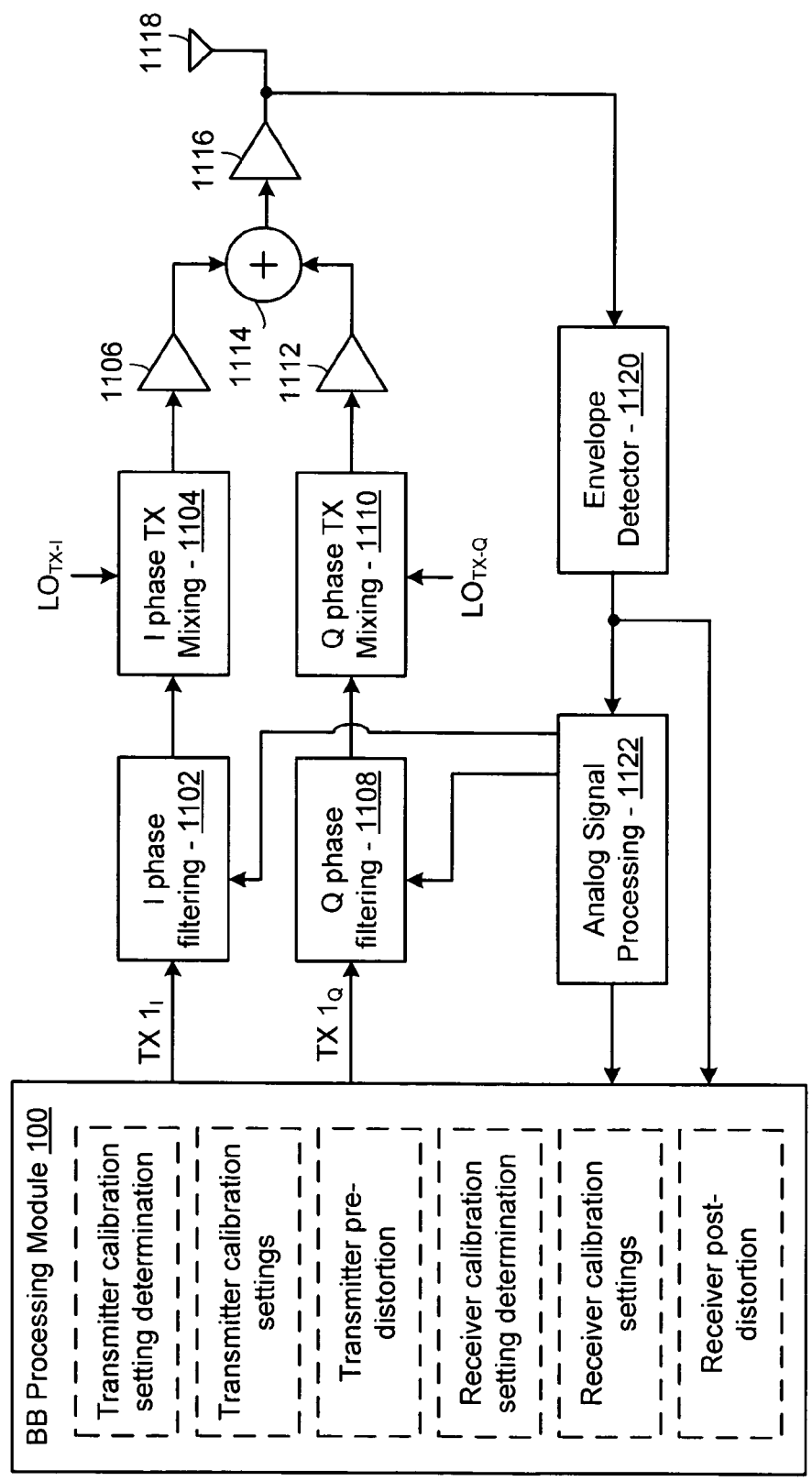
FIG. 11 is a block diagram illustrating a portion of an RF transceiver constructed and operating according to the present invention.

FIG. 11 is a block diagram illustrating a portion of an RF transceiver constructed and operating according to the present invention. The baseband processing module 100 produces in phase TX $1_I$ and quadrature TX $1_Q$ analog baseband signals to the components of the RF transmitter 904. Baseband in-phase signal TX $1_I$ is received by in phase filtering block 1102, which filters the signal based upon transmitter calibration settings. The in phase filtering block 1102 produces an output signal to in phase mixing block 1104, which mixes the input signal with an in phase transmit local oscillation signal ($LO_{TX-I}$). The in phase up mixing block 1104 produces an output (RF frequency) to driver 1106.

Q phase filtering block 1108 receives quadrature signal TX $1_Q$ from the baseband processing module 100 and filters the input signal. Q phase mixing block 1110 receives the output of Q phase filtering block 1108 and mixes the signal with a quadrature phase transmit local oscillation signal $LO_{TX-Q}$. The Q phase mixing block 1110 produces an output to driver 1112. Adder 1114 adds the outputs of driver 1106 and driver 1112 to produce an RF frequency output signal. The output of adder 1114 is amplified by driver 1116, which produces an output to antenna 1118 for transmission.

During transmitter self calibration operations, transmit path components are activated with a test signal by baseband processing module 100. Envelope detector 1120 then detects an envelope signal at the output of driver 1116. Alternatively, the envelope detector 1120 detects a signal present at the output of driver adder 1114. The envelope detector produces an output to analog signal processing block 1122 and to the baseband processing module 100. The analog signal processing block 1122 determines filter settings for the in phase filtering block 1102 and for the Q phase filtering block 1108 for subsequent use.

Transmitter calibration setting determination operations of the baseband processing module 100 process the received signal to produce transmitter calibration settings for the RF transmitter of the subject RF transceiver group. These settings may be pre-distortion settings that are later applied by the baseband processing module 100 to a transmit baseband signal of the subject RF transceiver group prior to producing the baseband signal, e.g., TX $1_I$ and TX $1_Q$ to the RF transmitter of the subject RF transmitter group.

Figure 12:
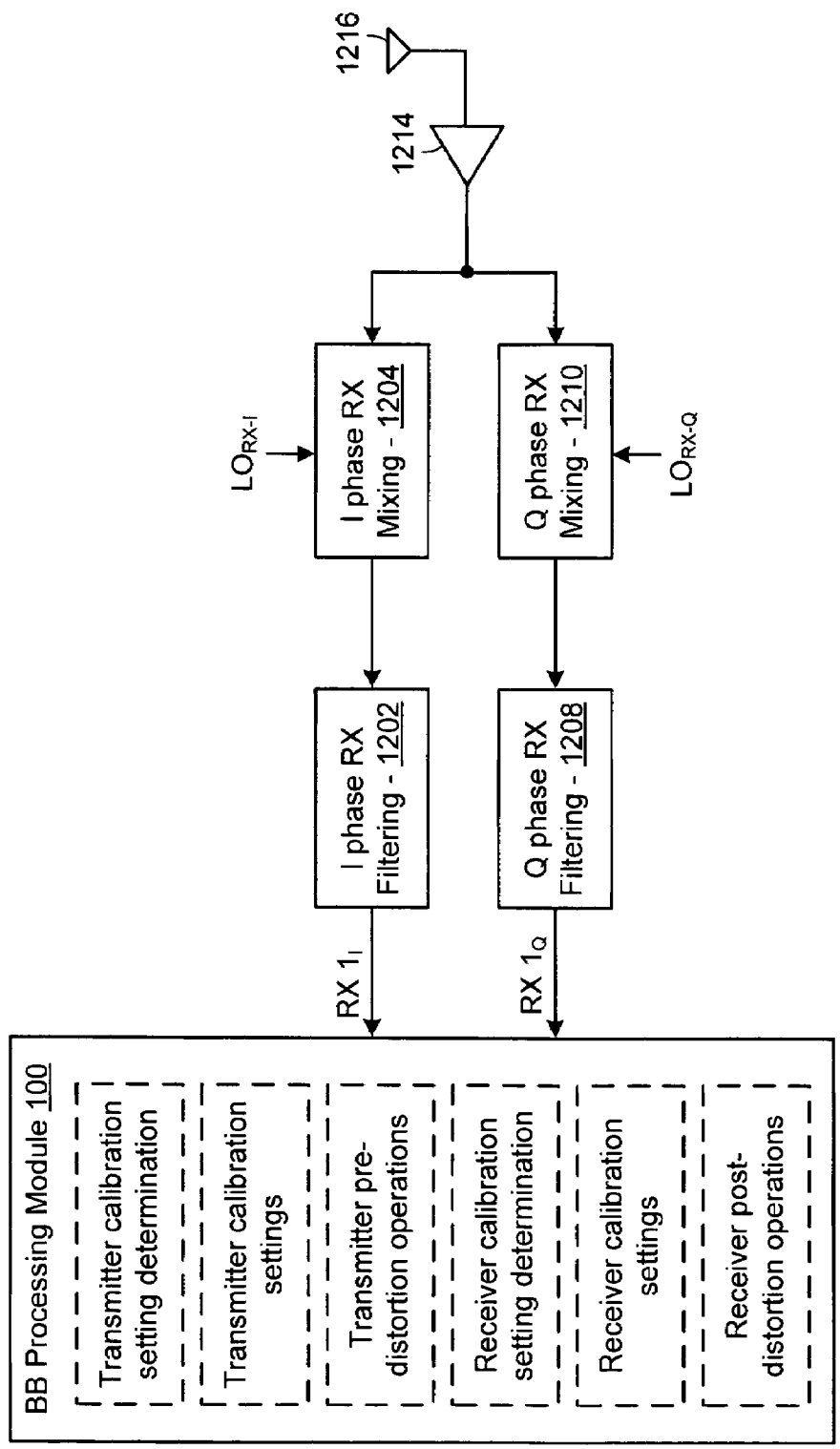
FIG. 12 is a block diagram illustrating another portion of the RF transceiver of FIG. 11 constructed and operating according to the present invention.

FIG. 12 is a block diagram illustrating another portion of the RF transceiver of FIG. 11 constructed and operating according to the present invention. During its receive operations (or RX calibration operations), the RF transceiver receives an RF signal via antenna 1216. The RF signal is amplified by a Low Noise Amplifier (LNA) 1214 and provided both to an in phase RX mixing block 1204 and to a Q phase RX mixing block 1210. The in phase RX mixing block 1204 mixes its input signal with an in phase RX local oscillation ($LO_{RX-I}$) to produce a baseband or low IF in phase signal, which is provided to in phase RX filtering block 1202. The in phase RX filtering block 1202 filters its input signal to produce a baseband in-phase signal (RX $1_I$) component. The quadrature phase RX mixing block 1210 mixes its input signal with a quadrature RX local oscillation ($LO_{RX-Q}$) to produce a baseband or low IF quadrature signal, which is received by quadrature phase RX filtering block 1208. The quadrature phase RX filtering block 1202 filters its input signal to produce a baseband quadrature signal (RX $1_Q$).

According to the present invention, during loopback calibration operations, receiver calibration setting determination operations of the baseband processing module 100 determine receiver calibration settings for the RF receiver of the subject RF transceiver group. The baseband processing module 100 may apply the receiver calibration settings to perform post distortion operations on received baseband signal components RX $1_I$ and RX $1_Q$.

Figure 13:
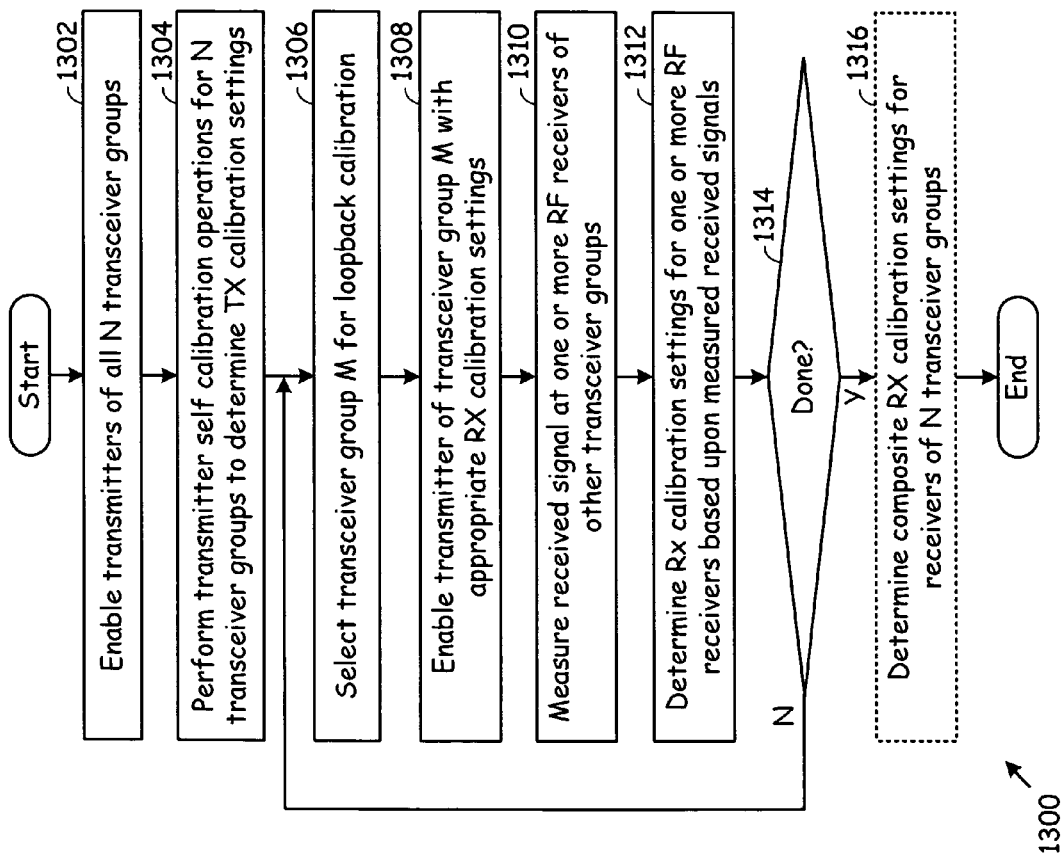
FIG. 13 is a flow chart illustrating RF transceiver calibration operations according to an embodiment of the present invention.

FIG. 13 is a flow chart illustrating RF transceiver calibration operations according to an embodiment of the present invention. Operations 1300 according to a first embodiment of the present invention commence with enabling RF transmitters of all N RF transceiver groups (Step 1302). As was previously described, each RF transceiver group may have one or more RF transmitters. According to one aspect of operation at Step 1302, all RF transmitters of all N RF transceiver groups are activated. Alternatively, some of the RF transmitters of the N RF transceiver groups are activated while others are not activated.

Then, operation includes performing RF transmitter self calibration operations for the N RF transceiver groups to determine transmitter calibration settings for each of the RF transmitters of each of the N transceiver groups (Step 1304). Then, RF transceiver group M is selected for loopback calibration operations (Step 1306). The selected RF transceiver has its RF transmitter enabled to transmit a test signal using appropriate transmitter calibration settings that were determined at Step 1304 (Step 1308). A received RF signal at one or more of the RF receivers of other transceiver groups is measured (Step 1310). Operation includes determining receiver calibration settings for the one or more active RF receivers based upon measured received RF signals (Step 1312). Next, a determination is made as to whether all loopback testing operations have been completed (Step 1314). If all loopback calibration operations have not been completed, operation returns to Step 1306 where another RF transceiver group is selected for loopback calibration operations. Alternatively, if all of the RF transceiver group loopback calibrations have been completed, additional composite post-distortion setting operations may be performed for the RF receivers of the N transceiver groups (optional Step 1316).

Figure 14:
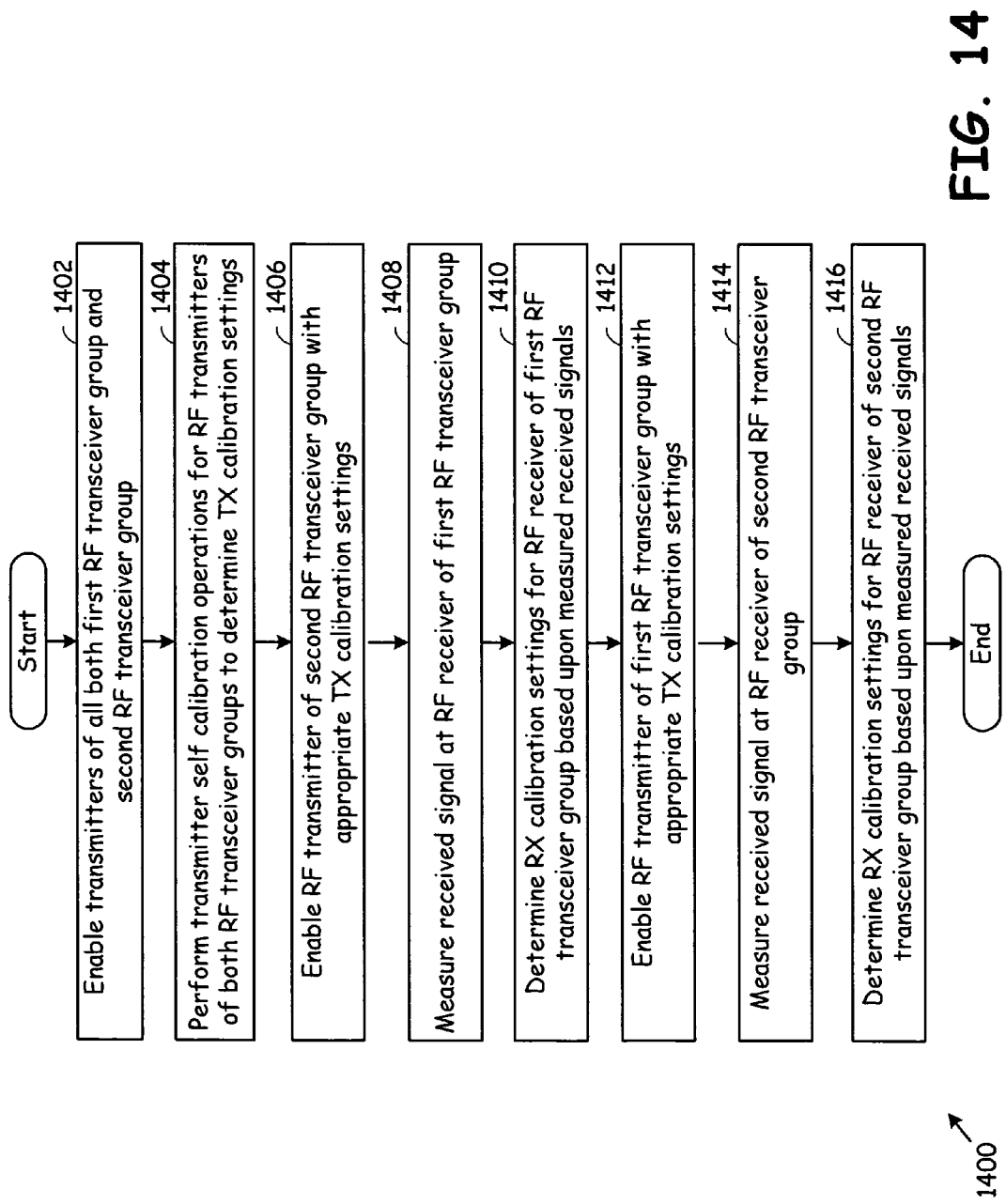
FIG. 14 is a flow chart illustrating RF transceiver calibration operations according to another embodiment of the present invention.

FIG. 14 is a flow chart illustrating RF transceiver calibration operations according to another embodiment of the present invention. Calibration operations for an RF transceiver having first and second RF transceiver groups are illustrated in FIG. 14. Operation 1400 contemplates calibration of RF transceiver groups having a single RF transmitter and a single RF receiver. Operation 1400 commences with enabling transmitters of both the first and second RF transceiver groups (Step 1402). Operation continues with performing RF transmitter self calibration operations for the RF transmitters of both RF transceiver groups to determine transmitter calibration settings for each of the RF transmitters (Step 1404). Then, operation includes enabling an RF transmitter of the second RF transceiver group with to produce a test signal with appropriate transmitter calibration settings (Step 1406). Operation continues with measuring the received RF signal at the RF receiver of the first RF transceiver group (Step 1408). Operation of Steps 1406 and 1408 includes the RF receiver of the first RF transceiver group measuring RF signals that are transmitted by the RF transmitter of the second RF transceiver group. Feedback of this RF signal may occur via a wireless feedback path, a parasitic coupling feedback path, or a dedicated feedback path between the RF transmitter of the second RF transceiver group and the RF receiver of the first RF transceiver group. Operation continues with determining receiver calibration settings for the RF receiver of the first RF transceiver group based upon the measured received signals (Step 1410).

Then, operation includes enabling the RF transmitter of the first RF transceiver group to produce a test signal with appropriate transmitter calibration settings (Step 1412). Operation continues with measuring a received signal at the RF receiver of the second RF transceiver group (Step 1414). Feedback of the RF signal produced by the RF transmitter of the first RF transceiver group via a wireless feedback path, a parasitic coupling feedback path, or a dedicated feedback path between the RF transmitter of the first RF transceiver group and the RF receiver of the second RF transceiver group. Finally, operation concludes with determining receiver calibration settings for the RF receiver of the second RF transceiver group based upon the measured received signals (Step 1416).

FIGS. 15A and 15B illustrate the baseband processing module and multiple transmitters and multiple receivers of the RF transceiver of FIG. 10 operating according to aspects of an embodiment of the present invention. Referring now to FIG. 15A, the operations of FIG. 14 are further described. During the first loopback calibration operations, the RF transmitter 906 of the second RF transceiver group is active and the receiver 902 of the first RF transceiver group is also active to receive a calibration signal via path 1502. Path 1502 may represent a wireless path that includes antennas, a parasitic coupling path, or a dedicated signal return path, for example. During this activation period, receiver calibration settings for the RF receiver 902 are determined. Optionally, RF receiver 908 of the second RF transceiver group may also be activated to receive the signal transmitted by RF transmitter 906.

Referring to FIG. 15B, the configuration during second loopback calibration operations of FIG. 14 are described. In such case, the RF transmitter 904 of the first RF transceiver group is active and the RF receiver 908 of the second RF receiver group is also active to receive a calibration signal via loopback path. Path 1554 may represent a wireless path that includes antennas, a parasitic coupling path, or a dedicated signal return path, for example. During this activation period, receiver calibration settings for the RF receiver 908 are determined. In an optional operation, RF receiver 902 of the first RF transceiver group is also activated to receive signals from RF transmitter 904. Thus, in this optional embodiment, signals received during two different loopback calibration operations may be used to determine receiver calibration settings for any of the RF receivers of any of the RF transceiver groups.

As one of ordinary skill in the art will appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled." As one of ordinary skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a phase locked loop with power distribution that reduces noise generated by the phase locked loop. By reducing noise within the phase locked loop, the phase locked loop may be used within a local oscillation generator to reduce noise therein. As one of ordinary skill in the art will appreciate, other embodiments may be derived from the teaching of the present invention without deviating from the scope of the claims.

The invention claimed is:

1. A Radio Frequency (RF) transceiver comprising:
a first RF transceiver group having an RF transmitter and an RF receiver;
a second RF transceiver group having an RF transmitter and an RF receiver;
local oscillation circuitry operable to selectively produce local oscillations to the first RF transceiver group and to the second RF transceiver group; and
calibration control circuitry operable to initiate calibration operations that include:
  transmitter self calibration operations to determine transmitter calibration settings for the RF transmitter of the first RF transceiver group and for the RF transmitter of the second RF transceiver group, the transmitter self calibration operations using an internal feedback path that is separate from the RF receivers to calibrate the RF transmitters;
  first loopback calibration operations during which the RF transmitter of the second RF transceiver group is active and the RF receiver of the first RF transceiver group is active to determine receiver calibration settings for the RF receiver of the first RF transceiver group, the first loopback calibration operations being performed only after calibrating the RF transmitters using the transmitter self calibration operations; and
  second loopback calibration operations during which the RF transmitter of the first RF transceiver group is active and the RF receiver of the second RF transceiver group is active to determine receiver calibration settings for the RF receiver of the second RF transceiver group, the second loopback calibration operations being performed only after calibrating the RF transmitters using the transmitter self calibration operations.

2. The RF transceiver of claim 1, wherein:
the transmitter calibration settings comprise pre-distortion calibration settings; and
the receiver calibration settings comprise post-distortion calibration settings.

3. The RF transceiver of claim 1, wherein during the transmitter self calibration operations:
the RF transmitter of the first RF transceiver group is active;
the RF transmitter of the second RF transceiver group is active; and
transmitter calibration settings for both the RF transmitter of the first RF transceiver group and the RF transmitter of the second RF transceiver group are determined.

4. The RF transceiver of claim 1, wherein during the first loopback calibration operations, the RF receiver of the second RF transceiver group is also active.

5. The RF transceiver of claim 1, wherein during the second loopback calibration operations, the RF receiver of the first RF transceiver group is also active.

6. The RF transceiver of claim 1, wherein the local oscillation circuitry comprises:
local oscillation generation circuitry operable to generate the local oscillation;
local oscillation distribution circuitry operable to distribute the local oscillation to the first RF transceiver group and to the second RF transceiver group; and
the local oscillation distribution circuitry having a first driver respective to the first RF transceiver group and a second driver respective to the second RF transceiver group, wherein the first and second drivers are substantially equally loaded during each of:
the transmitter self calibration operations;
the first loopback calibration operations;
the second loopback calibration operations;
data transmission operations; and
data receipt operations.

7. The RF transceiver of claim 5, wherein the local oscillation distribution circuitry resides substantially along a center line of symmetry of the RF transceiver.

8. The RF transceiver of claim 1, wherein the local oscillation circuitry is substantially equally loaded during each of:
the transmitter self calibration operations;
the first loopback calibration operations;
the second loopback calibration operations;
data transmission operations; and
data receipt operations.

9. The RF transceiver of claim 1, wherein:
the first RF transceiver group comprises a first RF band transmitter, a first RF band receiver, a second RF band transmitter, and a second RF band receiver; and
the second RF transceiver group comprises a first RF band transmitter, a first RF band receiver, a second RF band transmitter, and a second RF band receiver.

10. The RF transceiver of claim 9, wherein the calibration control circuitry is operable to separately initiate:
first RF band calibration operations for first RF band components of the RF transceiver; and
second RF band calibration operations for the second RF band components of the RF transceiver.

11. The RF transceiver of claim 1, wherein the first RF transceiver group, the second RF transceiver group, the local oscillation circuitry, and the calibration control circuitry are formed on a single Integrated Circuit.

12. A Radio Frequency (RF) transceiver comprising:
a plurality of RF transceiver groups, each RF transceiver group having an RF transmitter and an RF receiver;
local oscillation circuitry operable to selectively produce a local oscillation to the plurality of transceiver groups; and
calibration control circuitry operable to initiate calibration operations that include:
transmitter self calibration operations that determine transmitter calibration settings for the RF transmitters of the plurality of RF transceiver groups, the transmitter self calibration operations using an internal feedback path that is separate from the RF receivers to calibrate the RF transmitters;
a plurality of loopback calibration operations during each of which an RF receiver of a respective RF transceiver group is active, an RF transmitter of another RF transceiver group is active, and receiver calibration settings for the RF receiver of the respective RF transceiver group are determined, wherein for each of the loopback calibration operations, the loopback calibration is performed only after calibrating the RF transmitters using the transmitter self calibration operations; and
wherein during the transmitter self calibration operations and during each of the plurality of loopback calibration operations, the local oscillation circuitry is substantially equally loaded.

13. The RF transceiver of claim 12, wherein:
the transmitter calibration settings comprise pre-distortion calibration settings; and
the receiver calibration settings comprise post-distortion calibration settings.

14. The RF transceiver of claim 12, wherein during each of the plurality of loopback operations, respective previously determined transmitter calibration settings are applied to an active RF transmitter of the another RF transceiver group.

15. The RF transceiver of claim 12, wherein during each of the plurality of loopback calibration operations, at least one RF receiver of another of the RF transceiver groups is also active.

16. The RF transceiver of claim 12, wherein during each of the plurality of loopback calibration operations, only one RF transmitter is active.

17. The RF transceiver of claim 12, wherein the local oscillation circuitry comprises:
local oscillation generation circuitry operable to generate the local oscillation;
local oscillation distribution circuitry operable to distribute the local oscillation to the plurality of RF transceiver groups; and
the local oscillation distribution circuitry having a first driver respective to a first set of the plurality of RF transceiver groups and a second driver respective to a second set of the plurality of RF transceiver groups, wherein the first and second drivers are substantially equally loaded during:
each of the transmitter self calibration operations;
each of the loopback calibration operations;
data transmission operations; and
data receipt operations.

18. The RF transceiver of claim 17, wherein the local oscillation distribution circuitry resides substantially along a center line of symmetry of the RF transceiver.

19. The RF transceiver of claim 12, wherein the local oscillation circuitry is substantially equally loaded during:
each of the transmitter self calibration operations;
each of the loopback calibration operations;
data transmission operations; and
data receipt operations.

20. The RF transceiver of claim 12, wherein the plurality of RF transceiver groups, the local oscillation circuitry, and the calibration control circuitry are formed on a single Integrated Circuit.

21. A method for calibrating a multiple core Radio Frequency (RF) transceiver comprising:
performing transmitter self calibration operations to determine transmitter calibration settings for RF transmitters of each of a first RF transceiver group and a second RF transceiver group, the transmitter self calibration operations using an internal feedback path that is separate from the RF receivers to calibrate the RF transmitters;
performing first loopback calibration operations during which the RF transmitter of the second RF transceiver group is active and an RF receiver of the first RF transceiver group is active to determine receiver calibration settings for the RF receiver of the first RF transceiver group, in which performing the first loopback calibration operations is performed only after calibrating the RF transmitters using the transmitter self calibration operations; and
performing second loopback calibration operations during which the RF transmitter of the first RF transceiver group is active and the RF receiver of the second RF transceiver group is active to determine receiver calibration settings for the RF receiver of the second RF transceiver group, in which the second loopback calibration operations is performed only after calibrating the RF transmitters using the transmitter self calibration operations.

22. The method of claim 21, wherein:
the transmitter calibration settings comprise pre-distortion calibration settings; and
the receiver calibration settings comprise post-distortion calibration settings.

23. The method of claim 21, wherein during the transmitter self calibration operations:
the RF transmitter of the first RF transceiver group is active;
the RF transmitter of the second RF transceiver group is active; and
transmitter calibration settings for both the RF transmitter of the first RF transceiver group and the RF transmitter of the second RF transceiver group are determined.

24. The method of claim 21, wherein during the first loopback calibration operations, the RF receiver of the second RF transceiver group is also active.

25. The method of claim 21, wherein during the second loopback calibration operations, the RF receiver of the first RF transceiver group is also active.

26. The method of claim 21, further comprising substantially equally loading local oscillation circuitry that provides a local oscillation to each of the first RF transceiver group and the second RF transceiver group during each of:
the transmitter self calibration operations;
the first loopback calibration operations;
the second loopback calibration operations;
data transmission operations; and
data receipt operations.

27. A method for calibrating a multiple core Radio Frequency (RF) transceiver comprising:
performing transmitter self calibration operations to determine transmitter calibration settings for RF transmitters of each of a plurality of RF transceiver groups, the transmitter self calibration operations using an internal feedback path that is separate from the RF receivers to calibrate the RF transmitters; and
performing a plurality of loopback calibration operations during each of which:
an RF receiver of a respective RF transceiver group is active;
an RF transmitter of another RF transceiver group is active; and
receiver calibration settings for the RF receiver of the respective RF transceiver group are determined, wherein for each of the loopback calibration operations, the loopback calibration is performed only after calibrating the RF transmitters using the transmitter self calibration operations.

28. The method of claim 27, wherein:
the transmitter calibration settings comprise pre-distortion calibration settings; and
the receiver calibration settings comprise post-distortion calibration settings.

29. The method of claim 27, wherein during the transmitter self calibration operations and during each of the plurality of loopback calibration operations, local oscillation circuitry servicing the plurality of RF transceiver groups is substantially equally loaded.

30. The method of claim 27, wherein during the transmitter self calibration operations:
RF transmitters of each RF transceiver group are active; and
transmitter calibration settings for each RF transmitter of the plurality of RF transceiver groups are determined.

31. The method of claim 27, further comprising substantially equally loading local oscillation circuitry that provides a local oscillation to each of the plurality of RF transceiver groups during each of:
the transmitter self calibration operations;
the plurality of loopback calibration operations;
data transmission operations; and
data receipt operations.

* * * * *